US012650865B1

(12) United States Patent
Sahu et al.

(10) Patent No.: US 12,650,865 B1
(45) Date of Patent: Jun. 9, 2026

(54) DYNAMIC ARTIFICIAL INTELLIGENCE ASSISTANT

(71) Applicant: Intuit Inc., Mountain View, CA (US)

(72) Inventors: Anshuman Sahu, Los Gatos, CA (US);
Diego Felix de Almeida, San Jose, CA
(US); Sharat Jagannath, San Jose, CA
(US); Clifford Green, San Diego, CA
(US); Kelsey Rae Conophy, Gallatin
Gateway, MT (US); **Katelyn Elizabeth
Swift-Spong**, San Francisco, CA (US);
Sonia Sharma, Fremont, CA (US);
Anmol Joshi, San Diego, CA (US);
Pavel Rakhlin, San Francisco, CA
(US); Shivakumara Narayanaswamy,
Mountain View, CA (US); **Trever
Thomas Cullen**, San Diego, CA (US);
Ziv Heimlich Shtacher, Hoboken, NJ
(US)

(73) Assignee: Intuit Inc., Mountain View, CA (US)

( * ) Notice: Subject to any disclaimer, the term of this
patent is extended or adjusted under 35
U.S.C. 154(b) by 0 days.

(21) Appl. No.: 19/283,678

(22) Filed: Jul. 29, 2025

(51) Int. Cl.
| | |
|---|---|
| *G06F 9/451* | (2018.01) |
| *G06F 3/0484* | (2022.01) |
| *G06F 16/332* | (2025.01) |
| *G06F 40/174* | (2020.01) |

(52) U.S. Cl.
CPC ............ *G06F 9/453* (2018.02); *G06F 3/0484*
(2013.01); *G06F 16/3326* (2019.01); *G06F
40/174* (2020.01)

(58) Field of Classification Search
CPC ....... G06F 40/174; G06F 3/0484; G06F 9/453
See application file for complete search history.

(56) References Cited

U.S. PATENT DOCUMENTS

| | | | | |
|---|---|---|---|---|
| 5,704,029 A | * | 12/1997 | Wright, Jr. ............ | G06F 40/174 |
| | | | | 345/173 |
| 6,690,390 B1 | | 2/2004 | Walters et al. | |
| 7,660,815 B1 | | 2/2010 | Scofield et al. | |
| 7,774,247 B2 | | 8/2010 | Hausman et al. | |

(Continued)

FOREIGN PATENT DOCUMENTS

| | | |
|---|---|---|
| GB | 2591903 A | 1/2014 |
| WO | 2014008502 A1 | 1/2014 |

OTHER PUBLICATIONS

Chen, Zichen, et al. "Xplainllm: A QA Explanation Dataset for
Understanding LLM Decision-Making." (2023). (Year: 2023).

*Primary Examiner* — Benjamin Smith
(74) *Attorney, Agent, or Firm* — Paradice and Li LLP

(57) ABSTRACT

Systems and methods for assisting a user of an online
resource are disclosed herein. The automated assistant may
receive a request for assistance to complete a task and
establish an interaction with the user. The task may include
a sequence of steps corresponding to a sequence of user
interface (UI) elements presented on the user's display
screen. The automated assistant may generate instructions
for the user based on transcripts of one or more previous user
interactions, and provide the instructions to the user via an
assistant interface presented on the user's display screen.
The automated assistant may determine whether or not the
user completes a respective step of the task, and either
indicate completion of the respective step or provide addi-
tional guidance.

14 Claims, 12 Drawing Sheets

(56)                   References Cited

U.S. PATENT DOCUMENTS

| | | | | |
|---|---|---|---|---|
| 7,813,965 B1 | 10/2010 | Robinson | | |
| 8,615,706 B2* | 12/2013 | Smith | | G06F 40/174 |
| | | | | 715/224 |
| 8,660,849 B2* | 2/2014 | Gruber | | B60K 35/10 |
| | | | | 340/988 |
| 9,043,386 B2* | 5/2015 | Halevi | | G06F 3/04855 |
| | | | | 709/203 |
| 9,436,670 B2* | 9/2016 | Anderson | | G06F 3/04817 |
| 9,460,058 B2* | 10/2016 | Maertens | | G06F 40/106 |
| 9,766,694 B2 | 9/2017 | Jung et al. | | |
| 10,229,100 B1* | 3/2019 | Lesner | | G06F 40/174 |
| 10,354,014 B2* | 7/2019 | Sharma | | H04W 12/082 |
| 10,354,132 B2* | 7/2019 | Kavikkal | | G06V 30/32 |
| 10,445,419 B2* | 10/2019 | Gaither | | G06F 40/174 |
| 10,460,024 B2* | 10/2019 | Gaither | | G06F 40/174 |
| 10,606,618 B2* | 3/2020 | Lubow | | G06F 9/453 |
| 10,657,200 B2* | 5/2020 | Gaither | | G06F 40/174 |
| 10,819,669 B2* | 10/2020 | McNeill | | G06Q 10/40 |
| 10,922,481 B2* | 2/2021 | Onuma | | G06F 3/0482 |
| 11,113,358 B2* | 9/2021 | Kieffaber | | G06F 3/0482 |
| 11,194,441 B2 | 12/2021 | Sattler et al. | | |
| 11,308,265 B1* | 4/2022 | Cohen | | G06F 3/167 |
| 11,308,266 B1* | 4/2022 | Estrada Diaz | | G06F 3/017 |
| 11,316,865 B2* | 4/2022 | Gallopyn | | H04L 51/02 |
| 11,606,463 B1* | 3/2023 | Yeracaris | | H04M 3/5232 |
| 11,714,601 B1* | 8/2023 | Knight | | G06F 3/0487 |
| | | | | 715/728 |
| 11,765,104 B2* | 9/2023 | Taslimi | | H04L 51/02 |
| | | | | 704/231 |
| 11,875,130 B1 | 1/2024 | Bosnjakovic et al. | | |
| 11,875,240 B1 | 1/2024 | Bosnjakovic et al. | | |
| 12,003,668 B1* | 6/2024 | Yeracaris | | H04M 3/4933 |
| 12,205,713 B2 | 1/2025 | Makeeva et al. | | |
| 12,210,839 B1 | 1/2025 | Burton | | |
| 12,307,065 B1 | 5/2025 | Browder | | |
| 12,393,433 B2* | 8/2025 | Agarwal | | G06F 40/174 |
| 2002/0062342 A1* | 5/2002 | Sidles | | H04L 67/561 |
| | | | | 715/224 |
| 2004/0036722 A1* | 2/2004 | Warren | | G06F 40/106 |
| | | | | 715/866 |
| 2004/0068527 A1 | 4/2004 | Smith, III | | |
| 2004/0104939 A1 | 6/2004 | Locke et al. | | |
| 2006/0106655 A1 | 5/2006 | Lettovsky et al. | | |
| 2006/0287897 A1 | 12/2006 | Sobalvarro et al. | | |
| 2007/0233736 A1 | 10/2007 | Xiong et al. | | |
| 2008/0276194 A1* | 11/2008 | Dykstra-Erickson | | |
| | | | | G06F 40/174 |
| | | | | 715/780 |
| 2009/0109455 A1* | 4/2009 | Smith | | G06F 40/174 |
| | | | | 358/1.9 |
| 2010/0088428 A1 | 4/2010 | Hendrickson et al. | | |
| 2011/0292084 A1 | 12/2011 | Thomas | | |
| 2012/0016678 A1* | 1/2012 | Gruber | | G06F 3/167 |
| | | | | 704/E21.001 |
| 2012/0089659 A1* | 4/2012 | Halevi | | G06Q 10/101 |
| | | | | 709/201 |

| | | | | |
|---|---|---|---|---|
| 2013/0205189 A1* | 8/2013 | DiPierro | | G06F 3/0483 |
| | | | | 715/224 |
| 2014/0142900 A1* | 5/2014 | Andre | | G06F 30/00 |
| | | | | 703/1 |
| 2015/0363376 A1* | 12/2015 | Anderson | | G06F 40/174 |
| | | | | 715/224 |
| 2016/0062955 A1* | 3/2016 | Maertens | | G06F 40/134 |
| | | | | 715/202 |
| 2016/0342431 A1 | 11/2016 | Huang | | |
| 2017/0153771 A1 | 6/2017 | Chu | | |
| 2017/0192948 A1* | 7/2017 | Gaither | | G06F 40/174 |
| 2017/0192949 A1* | 7/2017 | Gaither | | G06F 40/174 |
| 2017/0192950 A1* | 7/2017 | Gaither | | G10L 15/22 |
| 2017/0206096 A1* | 7/2017 | Lubow | | G06F 16/9577 |
| 2017/0336933 A1* | 11/2017 | Hassel | | G06F 3/167 |
| 2018/0069766 A1 | 3/2018 | Falkenberg | | |
| 2018/0307682 A1* | 10/2018 | Sharma | | H04W 4/80 |
| 2019/0065839 A1* | 2/2019 | Kavikkal | | G06Q 50/01 |
| 2019/0147029 A1* | 5/2019 | Chiu | | G06F 40/30 |
| | | | | 715/226 |
| 2019/0370292 A1 | 12/2019 | Irani et al. | | |
| 2019/0394149 A1* | 12/2019 | McNeill | | G06Q 10/40 |
| 2020/0004878 A1 | 1/2020 | Beaumont et al. | | |
| 2020/0042334 A1 | 2/2020 | Radebaugh et al. | | |
| 2020/0394259 A1* | 12/2020 | Onuma | | G06F 17/18 |
| 2021/0044546 A1* | 2/2021 | Taslimi | | G10L 15/1822 |
| 2021/0051152 A1* | 2/2021 | Gallopyn | | G16H 10/60 |
| 2021/0073301 A1* | 3/2021 | Kieffaber | | G06F 3/0482 |
| 2021/0157978 A1* | 5/2021 | Haramati | | G06F 40/177 |
| 2021/0166339 A1* | 6/2021 | Mann | | G06F 40/18 |
| 2021/0201240 A1 | 7/2021 | Yanamala | | |
| 2021/0295693 A1 | 9/2021 | Vallance et al. | | |
| 2022/0036490 A1* | 2/2022 | Chan | | G06Q 50/205 |
| 2022/0067270 A1* | 3/2022 | Tan | | G06F 16/338 |
| 2022/0121808 A1* | 4/2022 | Estrada Diaz | | G06F 40/174 |
| 2022/0157410 A1 | 5/2022 | Wei et al. | | |
| 2022/0269859 A1 | 8/2022 | Topol | | |
| 2022/0358448 A1 | 11/2022 | Beringer et al. | | |
| 2022/0400092 A1 | 12/2022 | Orkin et al. | | |
| 2022/0404956 A1 | 12/2022 | Choi et al. | | |
| 2023/0298568 A1 | 9/2023 | Moya | | |
| 2023/0333867 A1* | 10/2023 | Agarwal | | G06F 40/35 |
| 2023/0359812 A1* | 11/2023 | Cohen | | G10L 17/02 |
| 2024/0144916 A1 | 5/2024 | Britt et al. | | |
| 2024/0161627 A1 | 5/2024 | Odish et al. | | |
| 2024/0179218 A1 | 5/2024 | Jung | | |
| 2024/0220292 A1 | 7/2024 | Ellis | | |
| 2024/0338710 A1 | 10/2024 | Mica et al. | | |
| 2024/0394078 A1 | 11/2024 | Bonnet et al. | | |
| 2024/0394946 A1* | 11/2024 | Taei-Tehrani | | G06T 13/40 |
| 2025/0068833 A1* | 2/2025 | Wong | | G06F 40/174 |
| 2025/0103746 A1 | 3/2025 | Gharibi et al. | | |
| 2025/0245423 A1* | 7/2025 | Agarwal | | G06F 40/205 |
| 2025/0252252 A1* | 8/2025 | Shetty | | G06K 7/1417 |
| 2025/0315142 A1* | 10/2025 | Gilabert Llop | | G06F 3/04883 |
| 2025/0315598 A1* | 10/2025 | Burgess | | G06F 40/166 |
| 2025/0355697 A1 | 11/2025 | Stach et al. | | |
| 2026/0056560 A1 | 2/2026 | Lehoux-Lebacque et al. | | |

* cited by examiner

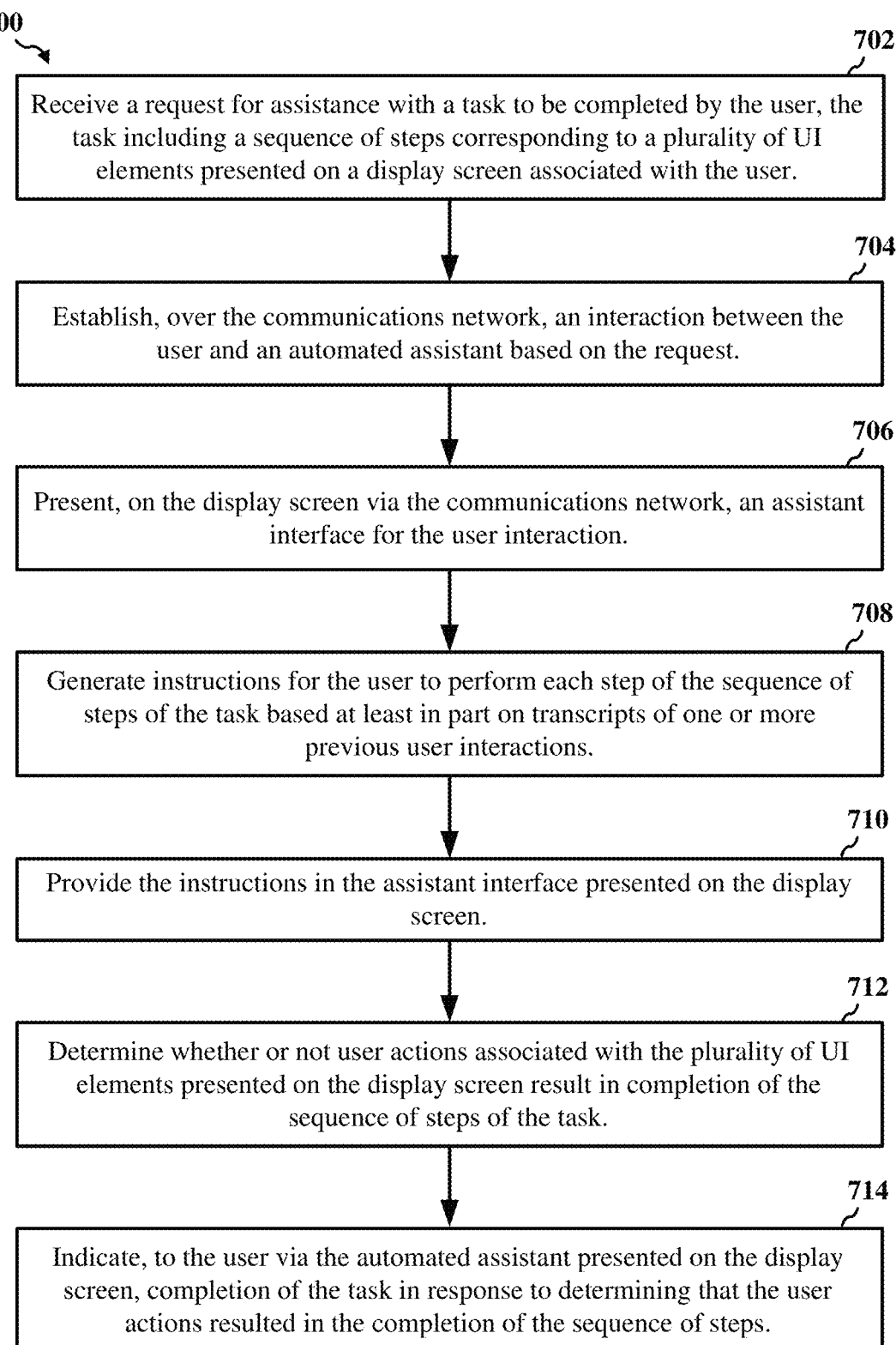

700

702

Receive a request for assistance with a task to be completed by the user, the task including a sequence of steps corresponding to a plurality of UI elements presented on a display screen associated with the user.

704

Establish, over the communications network, an interaction between the user and an automated assistant based on the request.

706

Present, on the display screen via the communications network, an assistant interface for the user interaction.

708

Generate instructions for the user to perform each step of the sequence of steps of the task based at least in part on transcripts of one or more previous user interactions.

710

Provide the instructions in the assistant interface presented on the display screen.

712

Determine whether or not user actions associated with the plurality of UI elements presented on the display screen result in completion of the sequence of steps of the task.

714

Indicate, to the user via the automated assistant presented on the display screen, completion of the task in response to determining that the user actions resulted in the completion of the sequence of steps.

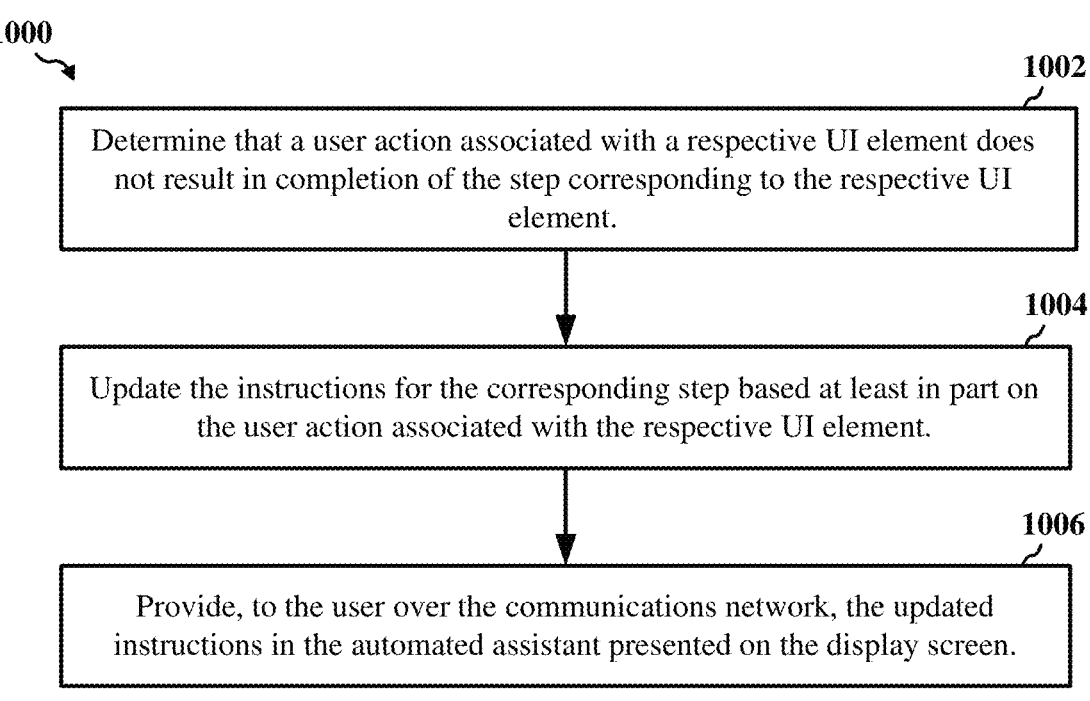

Determine that a user action associated with a respective UI element does not result in completion of the step corresponding to the respective UI element.

1004

Update the instructions for the corresponding step based at least in part on the user action associated with the respective UI element.

1006

Provide, to the user over the communications network, the updated instructions in the automated assistant presented on the display screen.

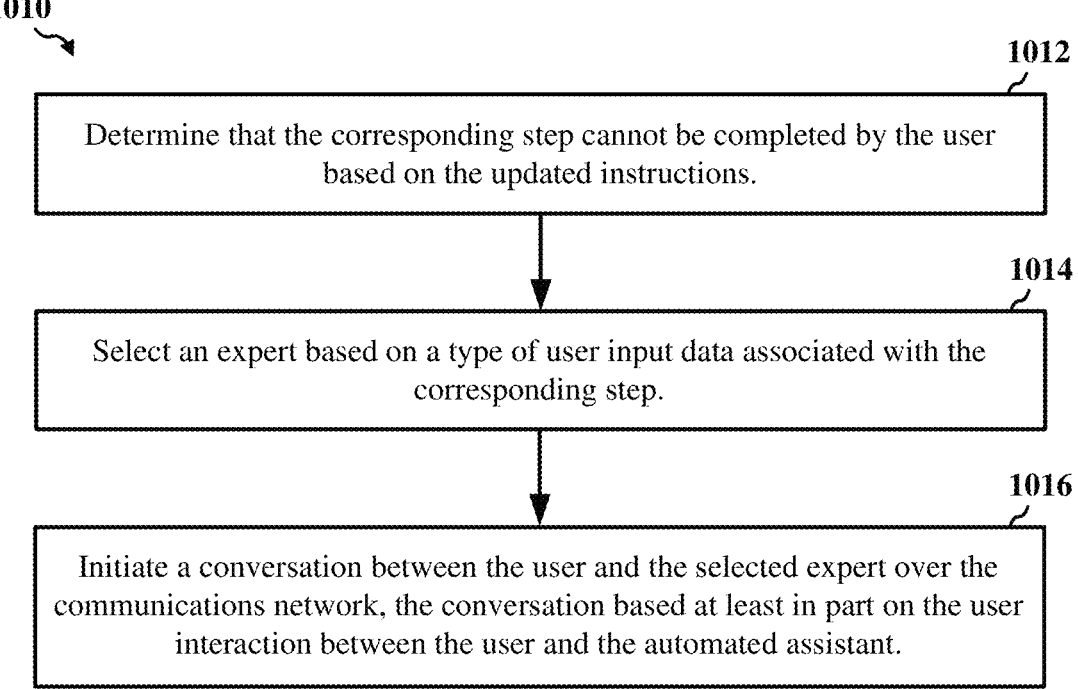

Determine that the corresponding step cannot be completed by the user based on the updated instructions.

1014

Select an expert based on a type of user input data associated with the corresponding step.

1016

Initiate a conversation between the user and the selected expert over the communications network, the conversation based at least in part on the user interaction between the user and the automated assistant.

Generate a transcript of the conversation between the user and the selected expert in response to determining that the user completed the corresponding step during the user interaction.

1024

Combine the transcript of the conversation with portions of transcripts of one or more previous user interactions associated with the corresponding step.

DYNAMIC ARTIFICIAL INTELLIGENCE ASSISTANT

DESCRIPTION OF RELATED ART

While traditional software products were typically installed on and executed by users' personal computers, many of today's software products and services reside partially or entirely online and can be remotely accessed by its users via one or more communications networks (such as the Internet). Although the increasing sophistication of these software products and services allow them to manage increasingly complicated tasks, the resulting complication of their user interfaces can overwhelm and frustrate users, which in turn can lead to greater numbers of user requests for assistance associated with these software products and services. Humans designated as experts in various workflows associated with such software products and services are typically provided to assist with user requests for assistance. However, the number of experts that can be made readily available for user assistance any given time may be limited by human resources constraints, which can lead to long and unpredictable user wait times for expert assistance.

Many online resources employ automated assistants that can provide users with 24/7 assistance with their product or service in a cost-effective manner. Many automated assistants employ multiple large language models (LLMs) that can be trained to generate responses to different user questions or queries. These assistants typically engage in user interactions through various channels, such as text-based conversations and voice-based dialogues. However, the effectiveness of these assistants can be limited by the availability of relevant information, as they often rely on manually created agent articles and/or predefined workflows associated with their corresponding product or service. Moreover, some users may need more personalized assistance, akin to interacting with human experts, than conventional automated assistants can provide. As a result, many users that engage with such automated assistants may ultimately escalate their requests for assistance to human support, which can undermine the efficiency and cost-effectiveness that these automated assistants are intended to provide.

Accordingly, there remains a significant need for more advanced solutions that can effectively address a wider range of user inquiries without human support.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter described in this disclosure can be implemented as a method for assisting a user of an online resource. The method, which may be performed by one or more processors associated with the online resource, may include receiving, from a user over a communications network coupled to the online resource, a request for assistance with a task to be completed by the user. The task may include a sequence of steps corresponding to a plurality of UI elements presented on a display screen associated with the user. The method may include establishing, over the communications network, a user interaction between the user and an automated assistant based on the request and presenting, on the display screen via the communications network, an assistant interface associated with the automated assistant. The method may include generating instructions for the user to perform each step of the sequence of steps of the task based at least in part on transcripts of one or more previous user interactions, and providing, to the user over the communications network, the instructions in the assistant interface presented on the display screen. The method may include determining whether or not user actions associated with the plurality of UI elements presented on the display screen result in completion of the sequence of steps of the task, and indicating, to the user via the assistant interface presented on the display screen, completion of the task in response to determining that the user actions resulted in the completion of the sequence of steps.

The instructions may be based on a mapping between the sequence of steps and the plurality of UI elements presented on the display screen. In some instances, the mapping is based on a graph of nodes interconnected by branches, with each node associated with instructions for a corresponding step of the sequence of steps and each branch originating at a respective node is associated with a different user action associated with the UI element corresponding to the respective node. The UI element currently selected by the user may be determined based on a position of the user's cursor on the display screen. In some instances, generating the instructions may include determining which of the plurality of UI elements presented on the display screen is currently selected by the user, identifying a sequence of nodes in the graph of nodes based on the step corresponding to the UI element currently selected by the user, and sequentially providing, on the assistant interface presented on the display screen, the instructions associated with the identified sequence of nodes.

The method may also include determining which of the plurality of UI elements presented on the display screen is currently selected by the user, determining that input data obtained from the user via the currently selected UI element results in completion of the corresponding step of the sequence of steps, and generating, on the display screen via the communications network, animation indicating a next UI element of the plurality of UI elements to be selected by the user to complete the task. In some aspects, an orientation of the animation is based on a position of the user's cursor on the display screen relative to a location of the next UI element presented on the display screen.

The method may also include determining that the user action associated with a respective UI element does not result in completion of the step corresponding to the respective UI element, updating the instructions for the corresponding step based at least in part on the user action associated with the respective UI element, and providing, to the user over the communications network, the updated instructions in the assistant interface presented on the display screen. In addition, or in the alternative, the method may also include determining that the corresponding step cannot be completed by the user based on the updated instructions, selecting an expert based on a type of user input data associated with the corresponding step, and initiating a conversation between the user and the selected expert over the communications network. The conversation may be based at least in part on the user interaction between the user and the automated assistant. In some instances, the method may also include generating a transcript of the conversation between the user and the selected expert in response to determining that the user completed the corresponding step during the conversation, and combining the transcript of the conversation with portions of transcripts of previous user interactions associated with the corresponding step.

Another innovative aspect of the subject matter described in this disclosure can be implemented in a computing system associated with an online resource. The computing system, which can be used to assist a user of an online resource, includes one or more processors coupled to a memory. The memory stores program code that, when executed by the one or more processors, causes the computing system to receive, from a user over a communications network coupled to the online resource, a request for assistance with a task to be completed by the user. The task includes a sequence of steps corresponding to a plurality of UI elements presented on a display screen associated with the user. Execution of the program code causes the computing system to establish, over the communications network, a user interaction between the user and an automated assistant based on the request, and to present, on the display screen via the communications network, an assistant interface associated with the automated assistant. Execution of the program code causes the computing system to generate instructions for the user to perform each step of the sequence of steps of the task based at least in part on transcripts of one or more previous user interactions, and to provide, to the user over the communications network, the instructions in the assistant interface presented on the display screen. Execution of the program code causes the computing system to determine whether or not user actions associated with the plurality of UI elements presented on the display screen result in completion of the sequence of steps of the task, and indicate, to the user via the assistant interface presented on the display screen, completion of the task in response to determining that the user actions resulted in the completion of the sequence of steps.

The instructions may be based on a mapping between the sequence of steps and the plurality of UI elements presented on the display screen. In some instances, the mapping is based on a graph of nodes interconnected by branches, with each node associated with instructions for a corresponding step of the sequence of steps and each branch originating at a respective node is associated with a different user action with the UI element corresponding to the respective node. The UI element currently selected by the user may be determined based on a position of the user's cursor on the display screen. In some instances, the computing system can generate the instructions by determining which of the plurality of UI elements presented on the display screen is currently selected by the user, identifying a sequence of nodes in the graph of nodes based on the step corresponding to the UI element currently selected by the user, and sequentially providing, on the assistant interface presented on the display screen, the instructions associated with the identified sequence of nodes.

Execution of the program code may also cause the computing system to determine which of the plurality of UI elements presented on the display screen is currently selected by the user, to determine that input data obtained from the user via the currently selected UI element results in completion of the corresponding step of the sequence of steps, and to generate, on the display screen via the communications network, animation indicating a next UI element of the plurality of UI elements to be selected by the user to complete the task. In some aspects, an orientation of the animation is based on a position of the user's cursor on the display screen relative to a location of the next UI element presented on the display screen.

Execution of the program code may further cause the computing system to determine that the user actions associated with a respective UI element does not result in completion of the step corresponding to the respective UI element, to update the instructions for the corresponding step based at least in part on the user interaction with the respective UI element, and to provide, to the user over the communications network, the updated instructions in the assistant interface presented on the display screen. In addition, or in the alternative, execution of the program code may further cause the computing system to determine that the corresponding step cannot be completed by the user based on the updated instructions, to select an expert based on a type of user input data associated with the corresponding step, and to initiate a conversation between the user and the selected expert over the communications network. The conversation may be based at least in part on the user interaction between the user and the automated assistant. In some aspects, execution of the program code further causes the computing system to generate a transcript of the conversation between the user and the selected expert in response to determining that the user completed the corresponding step during the conversation, and combining the transcript of the conversation with portions of transcripts of previous user interactions associated with the corresponding step.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 7 shows an illustrative flowchart depicting an example operation for assisting a user of an online resource, according to some implementations.

FIG. 10A shows an illustrative flowchart depicting another example operation for assisting a user of an online resource, according to some implementations.

FIG. 10B shows an illustrative flowchart depicting another example operation for assisting a user of an online resource, according to some implementations.

Like reference numbers and designations in the various drawings indicate like elements.

DETAILED DESCRIPTION

Figure 1:
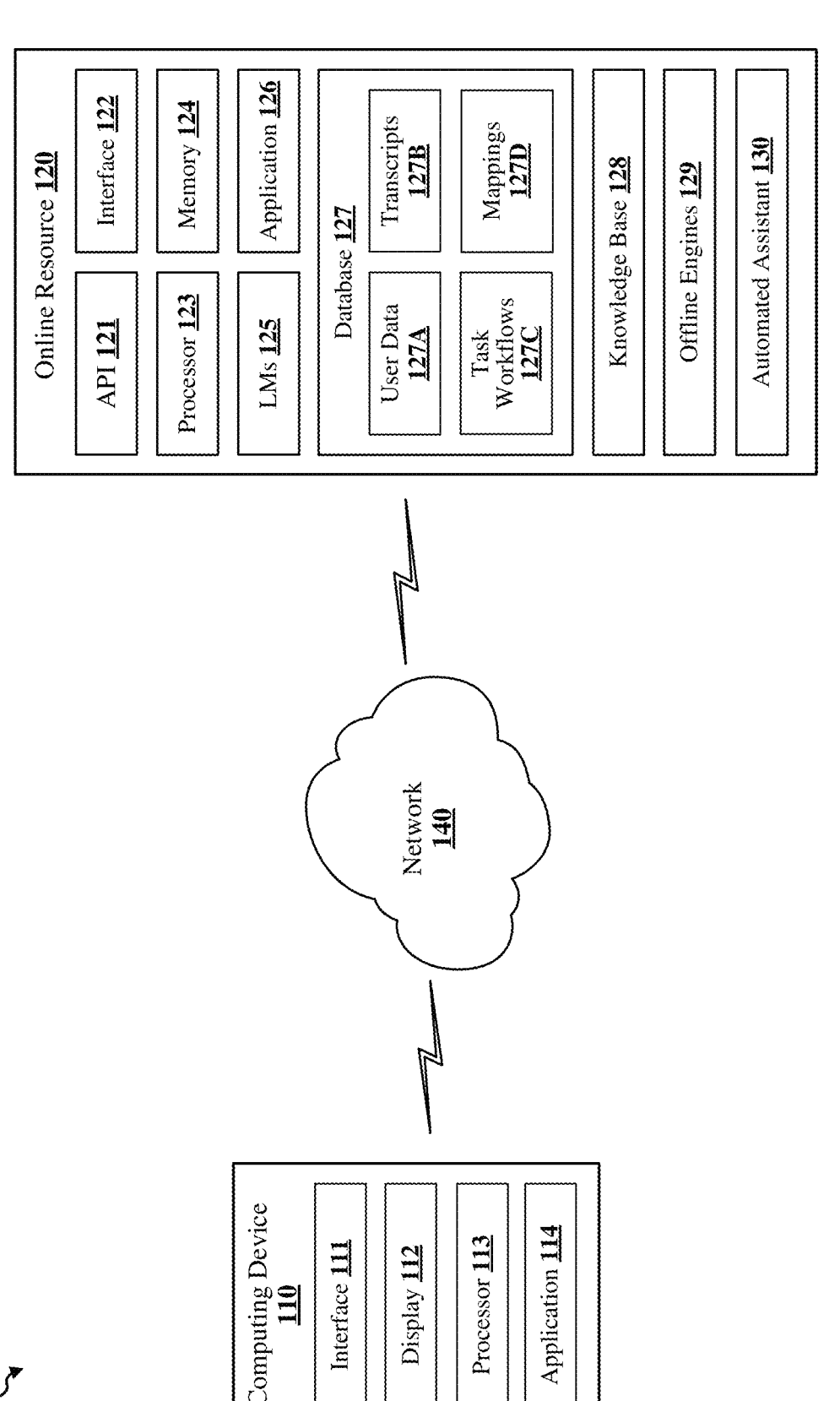
FIG. 1 shows an example network environment associated with an online resource, according to some implementations.

As discussed above, many online resources employ automated assistants that can provide users with assistance with a product or service without having to wait in a call queue for a human expert to become available. Conventional techniques for generating reference material used by automated assistants rely heavily on manual creation of articles or databases. However, these manually created resources are often out-of-date and lacking in volume and variety, and thus result in gaps in such reference material that can lead to incomplete or inadequate responses to user requests for assistance. Moreover, the static nature of conventional reference material may prevent these automated assistants from providing personalized assistance to user help requests.

Implementations of the subject matter described in this disclosure may facilitate an automated assistant that provides users of an online resource with dynamic, real-time assistance with performing various tasks related to a product or service associated with the online resource. The tasks may be related to accessing user accounts, optimizing workflows associated with the product or service, performing various operations within the product or service, and resolving issues or questions pertaining to the product or service, among other examples. The task may include a sequence of steps for the user to complete using a plurality of user interface (UI) elements presented on the user's display screen. The UI elements may include selectable buttons or icons, navigation links, data input fields, menus of pre-defined operations, and/or other suitable interactive fields through which the user can provide information or make selections related to the task. In various aspects, each of the steps associated with the task is associated with a corresponding UI element presented on the user's display screen, thereby allowing the sequence of steps of the task to be mapped to a corresponding sequence of the UI elements presented on the user's display screen.

The transcripts of a plurality of different user interactions with the automated assistant and/or other agents (such as human experts) can be used to generate corresponding workflows each including a sequence of nodes interconnected by node connectors (or branches), where the nodes represent the sequence of steps of a corresponding workflow and the node connectors represent actions to be performed by the user to transition along the sequence of steps of the corresponding workflow. The workflows can be transformed into graphs of interconnected nodes that are embedded into a vector space for retrieval by the automated assistant during subsequent user interactions with the automated assistant.

Then, during a subsequent interaction established between a user and the automated assistant over a communications networks, the automated assistant can obtain a task to be completed by the user and retrieve a workflow having the same or similar subjects or topics, along with its corresponding mapping information, to generate step-by-step instructions that help the user navigate through a sequence of user interface (UI) elements presented on the user's display screen. The step-by-step instructions can be provided to the user via an assistant interface presented on the user's display screen. The step-by-step instructions can be presented to user at the same time or sequentially as the user completes respective steps of the task. In various aspects, the automated assistant may also provide text, verbal, and/or visual cues (such as animation) to guide the user through the correct sequence of UI elements to complete the task. In this manner, the automated assistant can provide users with real-time step-by-step guidance for completing various tasks associated with the product or service without the need for human involvement.

The automated assistant can monitor the user's actions associated with the UI elements presented on the display screen to determine whether the user successfully completes each step of the task and/or correctly navigates through the sequence of UI elements associated with the task, and selectively provide additional guidance to the user based on the determination. For example, the automated assistant can determine which of the UI elements is currently selected by the user (e.g., based on the user's cursor position), and determine whether input data provided by the user via the currently selected UI element is sufficient to complete the current step of the task. If so, the automated assistant can guide the user to the next UI element presented on the user's display screen, for example, using animation. If not, the automated assistant can provide updated instructions to help the user complete the step. For example, if the type of input data provided by the user is inconsistent with the type of input data expected at the current step, the automated assistant can indicate, in the assistant interface presented on the user's display screen, the type of input data associated with completing the step. For another example, if the user completes the step but then navigates to the wrong UI element to complete the next step of the task, the automated assistant can provide updated instructions and/or visual cues (such as highlighting or animation) to guide the user to the correct UI element to complete the next step of the task.

In some instances, the automated assistant may determine that the user is unable to complete a step of the task (e.g., because the user repeatedly enters an incorrect type of input data for the step, has remained at the same UI element for a certain duration of time, or repeatedly navigates to UI elements that are not associated with step, among other examples), and then initiate a conversation between the user and an expert over the communications network. The expert may be selected based on the type of input data associated with the step, and the initiated conversation may be based at least in part on the user's corresponding interaction with the automated assistant. If the expert is successful in assisting the user to complete the step, a transcript of the conversation between the user and the expert may be combined with corresponding portions of transcripts of previous user interactions with the automated assistant and/or other experts, and thereafter used to update the corresponding graphs of interconnected nodes embedded into the vector space. In this way, the automated assistant can continually learn from user interactions and conversations with experts to not only increase the speed with which the step-by-step instructions can be generated but also increase the ability of the automated assistant to successfully guide the user through the steps of a task without human intervention.

The systems and methods described herein provide several technical benefits over conventional solutions for generating knowledge bases that can facilitate automated assistants capable of providing real-time step-by-step instructions to users of products or services associated with online resource. By leveraging transcripts of a plurality of different user interactions with the automated assistant to generate a corresponding plurality of node-based workflows that can be transformed into graphs of interconnected nodes embedded in a vector space, the system enables efficient retrieval of relevant information during subsequent user interactions, even when topics are new or unseen. By automating the process of knowledge base generation and maintenance, the system reduces manual effort, accelerates model development, and increases the speed and accuracy with which automated assistants disclosed herein can provide real-time assistance to users during subsequent user interactions with the system.

Aspects of the present disclosure address the technical problem of generating comprehensive and accurate knowledge bases for automated assistants that can assist users of an online resource, which can be limited by manually created resources that are often out-of-date and lacking in volume and variety. This problem arises from the limitations of conventional approaches that rely on manual creation of articles or databases, leading to gaps in knowledge that result in inadequate responses or complete failure in addressing user inquiries. Aspects of the subject matter disclosed herein are not an abstract idea, such as a mere mental process that can be performed solely by the human mind. For example, while a human may attempt to manually create and update knowledge bases or estimate relevance based on limited information, they cannot feasibly analyze complex transcripts from user interactions with the system, transform the transcripts into node-based workflows each including a sequence of nodes representing instructions extracted from a respective transcript and node connectors representing actions to be performed by the user between the sequence of nodes, and generate graphs of interconnected nodes, based on the node sequences and connectors of the corresponding workflows, that can be embedded into a vector space for retrieval by the automated assistant during subsequent user interactions. The present disclosure leverages sophisticated computational techniques (e.g., training LMs to generate questions and answers from transcripts, computing quality scores based on accuracy, relevance, consistency, completeness, coherence, or generality, and continuously updating predictions using advanced statistical models) that achieve results far beyond human capability, thereby providing a technical solution to the problem of generating comprehensive and accurate knowledge bases for such automated assistants. Moreover, the subject matter disclosed herein is not directed to organizing human activity or any conventional economic practice, but rather provides a technical solution to a problem that requires sophisticated computer technology. Specifically, various implementations of the present disclosure provide specific inventive steps to automate the generation and maintenance of knowledge bases using transcript data from user interactions, thereby improving the accuracy, efficiency, and scalability of such automated assistants in modern computer-based systems.

In the following description, numerous specific details are set forth such as examples of specific components, circuits, and processes to provide a thorough understanding of the present disclosure. The term "coupled" as used herein means connected directly to or connected through one or more intervening components or circuits. As used herein, automated assistants may also be referred to as "digital agents," "chatbots," "interactive personal assistants," "intelligent personal assistants," "conversational agents," among other examples). Also, in the following description and for purposes of explanation, specific nomenclature is set forth to provide a thorough understanding of the aspects of the disclosure. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing, and other symbolic representations of operations on data bits within a computer memory.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. As such, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows an example network environment 100 associated with an online resource, according to some implementations. The network environment 100 is shown to include a computing device 110, an online resource 120, and a communications network 140. The computing device 110, which can be any suitable wired or wireless computing device that can access and communicate with the online resource 120 over the communications network 140, is associated with a user of the online resource 120. The computing device 110 can be a desktop computer, laptop computer, tablet computer, personal digital assistant, cellular telephone, smartphone, electronic book reader, or other suitable device capable of accessing and communicating with the online resource 120 over the communications network 140. Although only one computing device 110 is shown in the example of FIG. 1 for simplicity, any number of other computing devices can be used to connect other users to the online resource 120 over the communications network 140. In addition, although not shown for simplicity, the network environment 100 may include other computing devices, servers, interfaces, online resources, or third-party systems.

The computing device 110 is shown to include an interface 111, a display screen 112, a processor 113, and a software application 114. The interface 111 and display screen 112 allow the user to interact with the online resource

120 over the communications network 140. The interface 111 may include a keyboard, a mouse (or other suitable user movement tracking device), an audio interface (e.g., microphone and speakers), a headset (e.g., a virtual reality headset or augmented reality headset), or haptic interface (among other examples) through which data and other information can be exchanged between the user and the online resource 120. For example, requests, queries, input data, and other information provided by the user via the interface 111 can be transmitted over the communications network 140 to the online resource 120 by one or more transceivers (not shown for simplicity) associated with the computing device 110, and corresponding responses, answers, output data, and other information generated by the online resource 120 can be received from the communications network 140 via the one or more transceivers associated with the computing device 110.

The display screen 112 can be any suitable monitor or display screen through which data and other information provided by the online resource 120 can be presented to the user and through which data and other information can be provided to the online resource by the user. In some implementations, a plurality of user interface (UI) elements associated with a product or service provided by the online resource 120 can be presented to the user via the display screen 112. For example, in some instances, the user can select a UI element and then enter information into the selected UI element using a mouse and keyboard, while in other instances, the display screen 112 can be a touch-sensitive display through which the user can select and enter information into the UI elements using touch input on the touch-sensitive display.

In various aspects, an assistant interface associated with an automated assistant provided by the online resource 120 can be presented on the user's display screen 112. The automated assistant can use the assistant interface to provide real-time assistance to the user when seeking to perform a task or operation associated with the product or service. For example, the assistant interface can provide the user with step-by-step instructions for completing a sequence of steps associated with the task, can identify one or more of the UI elements presented on the display screen 112 (e.g., a UI element corresponding to a current step or a next step of the sequence, among other examples), and can provide the user with feedback (e.g., indicating whether or not the user has selected the UI element that corresponds to the current step or highlighting the UI element that corresponds to the next step, among other examples), and other suitable assistance.

The processor 113 can be any suitable one or more processors capable of executing program code of one or more software programs stored in a suitable memory (not shown for simplicity) of the computing device 110. In some implementations, the processor 113 can include one or more microprocessors and an associated with memory. In other implementations, the processor 113 can be one or more Application Specific Integrated Circuit (ASICs), Field Programmable Gate Arrays (FPGAs), or Programmable Logic Devices (PLDs), among other examples.

The software application 114 allows the user to access, communicate, and exchange information with the online resource 120 over the communications network 140. In some instances, the software application 114 may locally executed software (e.g., a local client) associated with a product or service provided by the online resource 120. In other instances, the application 114 may be a generic browser through which the user can access and interact with products or services provided by the online resource 120. In some other instances, the software application 114 may be an "App" suitable for mobile devices.

The online resource 120 may provide a broad range of products, services, subscriptions, and/or applications (among other examples) over the communications network 140 to the user via associated computing device 110. Although not shown for simplicity, the online resource 120 can provide these products, services, subscriptions, and/or applications to a plurality of other users associated with other computing devices. In the example of FIG. 1, the online resource 120 is shown to include an application program interface (API) 121, a processor 123, a memory 124, a database 127, an automated assistant 130, a knowledge base 128, and one or more applications 126.

The API 121 can provide a programmatic interface that allows the computing device 110 to communicate with the online resource 120 over the communications network 140. In some instances, the programmatic interface of the API 121 can allow the application 114 residing on the computing device 110 to request invocation of the automated assistant 130, to receive requests, queries, input data, and other information from the computing device 110, and to transmit responses to the requests, answers to the queries, output information, and other information over the communications network 140 to the computing device 110. In other instances, the API 121 can implement a user portal through which a web browser associated with the computing device 110 can be used to access and exchange information with the online resource 120 over the communications network 140.

In various aspects, the API 121 can receive requests from the computing device 110 as Hyper-Text Transfer Protocol (HTTP) requests, API requests, or other web-based requests and thereafter communicate with the computing device 110 using one or more Hyper Text Markup Language (HTML) files responsive to the request. The API 121 may, in conjunction with an application logic layer (not shown for simplicity), generate the HTML files as web pages that can be transmitted to the computing device 110 over the communications network 140. In some aspects, the computing device 110 may present HTML files received from the online resource 120 as web pages to the user via the display screen 112.

The interface 122 may include one or more input/output (I/O) interfaces used for transmitting or receiving transmissions, metadata, identifiers, tags, flags, scores, prompts, vectors, assessments, queries, answers, or the like with the user's computing device 110 over the communications network 140. The interface 122 may also be used to provide or receive other suitable information, such as computer code for updating one or more programs stored on the online resource 120, internet protocol requests and results, or the like. In various implementations, the interface 122 includes an interface with an ethernet cable to a modem, which may be used to communicate with an internet service provider (ISP) directing traffic to and from user devices and/or other parties.

The processor 123 includes one or more suitable processors capable of executing scripts or instructions of one or more software programs stored in the online resource 120, such as within the memory 124. In some implementations, the processor 123 includes a general-purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In some implementations, the processor 123 includes a combination of computing devices, such as a combination of a DSP and a microprocessor, a plurality of microprocessors, one or more microprocessors in conjunction with a DSP core, or any other suitable configuration. In some implementations, the processor 123 incorporates one or more hardware accelerators for processing a large amount of data and/or one or more artificial intelligence (AI) accelerators for accelerating AI and machine learning (ML)-based operations, such as one or more graphics processing units (GPUs), one or more tensor processing units (TPUs), one or more neural processing units (NPUs), a wafer-scale integration (WSI) architecture, or the like. For example, the processor 123 may use hardware-based TPUs to process and/or adjust millions, billions, or trillions of artificial neural network (ANN) parameters within seconds, milliseconds, or microseconds. As another example, one or more hardware-based NPUs may be used to accelerate ANN computations based on being optimized for efficiently executing deep learning (DL) techniques and performing AI and/or ML tasks (e.g., image recognition, natural language processing (NLP), executing trained AI models for inference, and the like).

The memory 124, which may be any suitable persistent memory (such as non-volatile memory or non-transitory memory), may store any number of software programs, executable instructions, machine code, algorithms, and the like (collectively referred to herein as "program code") that can be executed by the processor 123 to perform one or more corresponding operations or functions. In some aspects, execution of execute program code stored in memory 124 can cause the online resource 120 to perform various operations described herein. In some instances, hardwired circuitry may be used in place of, or in combination with, software instructions to implement aspects of the disclosure.

The LMs 125 may be any suitable generative AI models trained on a large corpus of text to generate written responses, answer questions, translate language, and/or assist with various NLP-related tasks. In various aspects, one or more of the LMs 125 may be used to generate questions based on user portions of transcripts, generate answers based on agent portions of transcripts, generate assessments of and/or scores for Q&A pairs, determine a subject of a query, generate an answer to a query based on relevant Q&A pairs, or the like. The generations may be output by the LM 125 as a sequence of concatenated output tokens in the form of strings of text. Each of the LMs 125 may be associated with a model vocabulary comprising tens of thousands to hundreds of thousands of unique tokens (e.g., characters or combinations of characters). In some instances, the LM 125 may be a large language model (LLM), a multimodal large language model (MLLM), or a small language model (SLM). In other instances, one or more of the LMs 125 are integrated directly or embedded into one or more of the applications 126, the online resource 120, the automated assistant 130, or a separate component or service.

In various implementations, the LMs 125 may be hosted in conjunction with the online resource 120 (e.g., as a containerized microservice), the LMs 125 may be hosted externally (e.g., accessed via API 121 or cloud-based services) and in direct communication with one or more of the applications 126, or the LMs 125 may be hosted externally and in indirect communication with the at least one application 126 or the online resource 120, for example (e.g., via an intermediate service, application, or system, such as an AI firewall). In various implementations, the LMs 125 may use various AI accelerators to process vast amounts of textual data (e.g., from the Internet), integrate with one or more ANNs with millions, billions, trillions, or more weights or parameters, use self-supervised and/or semi-supervised training methods, and/or incorporate aspects of the transformer architecture and/or mixture of experts (MoE). Example LMs may include OpenAI's ChatGPT, Google's Gemini, Meta's LLaMa, BigScience's BLOOM, Baidu's Ernie, Anthropic's Claude, Mistral AI's Mistral, independently developed models, or any another suitable type of generative AI model that outputs strings of text formed by a concatenation of tokens.

The applications 126 may include one or more interconnected modules or components that interact with each other to perform one or more functions or tasks, such as providing a desired functionality to a user that interacts with a respective application 126 and/or the online resource 120 via the interface 122. The applications 126 allow a user to access, communicate, and/or exchange information with various components of the online resource 120 (such as the automated assistant 130). The applications 126 may include software products or services (such as QuickBooks® available Intuit, Inc.) that can be accessed and utilized by users over the communications network 140 via associated computing devices 110. In various implementations, the one or more applications 140 integrate aspects of ML, deep learning (DL), or AI to provide predictive capabilities, personalized recommendations, decision-making automation, or the like. The applications 126 may also provide functionalities such as generating the knowledge base 128 and facilitating communication between the automated assistant 130 and the knowledge base 128.

The applications 126 may have a monolithic architecture, a microservices architecture including a plurality of services coupled via one or more application programming interfaces (APIs), and/or a distributed architecture across a plurality of processes and/or machines and network protocols. In various aspects, the applications 126 may be deployed on a variety of hardware platforms, mobile devices, embedded systems, or cloud servers, and may incorporate one or more CPUs, GPUs, TPUs, FPGAs, sensors, or other specialized hardware and/or AI-based accelerators designed to optimize performance for deep learning (DL) tasks. Some non-limiting example application tasks may include data processing, data analytics, fraud detection, transaction analysis, model simulation, static communication, real-time communication, collaboration, project management, entertainment, streaming, gaming, or any other suitable application task.

The database 127 may store data associated with the online resource 120 including, for example, transcripts, models, data associated with the knowledge base 128, subjects, Q&A pairs, vectors, metadata, identifiers, tags, flags, scores, user portions, agent portions, prompts, instructions, assessments, queries, requests, and articles, among other suitable information. In various implementations, the database 127 may also store text input history, prompt history, reasoning, documents, categories, embeddings, lists, entities, arrays, logits, strings, events, datasets, instances, attributes, values, variables, degrees or measures (or other suitable quantities), decision trees, engines, classifiers, formulas, metrics, input, output, responses, application information, configurations, data associated with attacks and mitigation techniques, data associated with changes, events, change data capture (CDC) information, event bus (EB) information, filters, data assets, preferences, priorities, timestamps, models, algorithms, modules, engines, user information, historical data, recent data, current or real-time data, files, plugins, arrays, feedback, formats, features, among other suitable information. In some instances, the database 127 may store vectorized embeddings or other high-dimensional representations and associated feature vectors in a vector space, for example, to enable efficient workflow extraction associated with tasks for which a user requests assistance, mappings between a sequence of steps associated with the task and a plurality of UI elements presented to the user, context matching, clustering, and advanced artificial intelligence (AI) analytics. In some aspects, portions of the database 127 may incorporate aspects of a vector database or may be embedded in a multi-database architecture that enables proximity metrics and vector space computations.

The database 127 may store data related to artificial neural network (ANN) models, such as the models themselves, untrained models, pretrained models, tuned models, aligned models, reward models, neural network (NN) parameters (e.g., weights, biases, tensors, parameters), architectures (e.g., layer descriptions, neurons, activation functions, overall structures), training data and related information (e.g., statistics, distribution, size, preprocessing steps, training data, text corpora, tuning data, alignment data, alignment data snapshots, alignment preferences, metric logs, accuracies, loss functions and values), hyperparameters (e.g., learning rates, batch sizes, numbers of epochs), evaluation results (e.g., performance metrics and models, validation data, test sets, benchmark scores, thresholds, receiver operating characteristic (ROC) curves, confusion matrices), versioning information (e.g., iterations, updates), metadata and documentation (e.g., usage instructions, authors), deployment configurations (e.g., settings for deploying models in different environments), monitoring data (e.g., real-time or periodic tracking performance in production), or any other suitable data related to ANN models.

The database 127 may store data in one or more cloud object storage services, such as one or more Amazon Web Services (AWS)-based Simple Storage Service (S3) buckets. In various implementations, the database 127 incorporates aspects of a database management system (DBMS) or a relational DBMS (RDBMS). The data may be stored in one or more JavaScript Object Notation (JSON) files, comma-separated values (CSV) files, or any other suitable data objects for processing by the online resource 120. In some implementations, the data may be stored in one or more Structured Query Language (SQL) compliant datasets for filtering, querying, and sorting, or any other suitable format for processing by the online resource 120. In various implementations, the database 127 includes a relational database capable of presenting information as datasets in tabular form and capable of manipulating the datasets using relational operators.

In the example of FIG. 1, the database 127 is shown to store user data 127A, user transcripts 127B, task workflows 127C, and mappings 127D. The user data 127A may include information specific to each of a plurality of users associated with the online resource 120. The user-specific information may include the user's profile information, the user's subscription information, historical data, and other suitable information. The profile information may include the user's account information, username, password, email address, phone number, employment information, personal attributes or characteristics, and the like. The subscription information may identify the products or services provided by the online resource 120 for which the user has an active subscription, and may also identify the user's subscription history. The historical data may include previous interactions between the user and the automated assistant, previous interactions between the user and human experts, previous assistance provided to the user by the online resource 120, the user's navigation history within a particular product or service provided by the online resource 120, and the user's browsing history through self-help resources, among other examples.

The transcripts 127B may include transcripts of interactions between users and agents or professionals associated with the online resource 120. The interactions may include calls, message exchanges, or other conversations between the users and professionals (such as a human experts) associated with a particular product or service and/or dialog sessions between the users and the automated assistant 130. In various aspects, the transcript for a given interaction can be generated by a transformation engine that is trained to learn terminology specific to the context (e.g., subject matter or topic) of the interaction.

The task workflows 127C may include one or more workflows for each of a plurality of tasks associated with a respective product or service provided by the online resource 120. The with which the user may need assistance that can be accessed by the user over the communications network 140 using computing device 110. In some implementations, the user may have an account that can be accessed from the online resource 120 over the communications network 140 using the computing device 110, and may need assistance to complete any number of tasks associated with the account. The user can use a locally-executed client, a web browser, or other suitable user interface to access the online resource 120, which in turn can present an account interface on the user's display screen. The account interface may include a plurality of UI elements through which the user can access information associated with the account, can modify information associated with the account, and can perform various operations associated with the account. For example, the task may be to add an employee to the user's account, and the corresponding sequence of steps may include (1) navigating to the employee tab of the interface presented on the user's display screen with an online The mappings 127D may include a mapping for each of the tasks included in the task workflows 127C. Each mapping indicates a relationship between the sequence of steps of the task and a corresponding plurality of UI elements presented on the user's display screen 112. In some instances, the sequence of steps of a particular task can be mapped to a series of corresponding UI elements presented on the user's display screen, for example, so that the user can complete the particular task by sequentially navigating to the corresponding UI elements and then providing or selecting the correct information associated with the corresponding UI elements. In accordance with various aspects of the present disclosure, the automated assistant 130 can be displayed in the assistant interface presented on the user's display screen 112 and can assist the user to complete a task associated with a product or service for which the user has an account with the online resource 120. In various aspects, the automated assistant 130 can use the mappings 127D for the task to provide the user with step-by-step instructions explaining how to complete the task. In some instances, the automated assistant 130 can use the mappings 127D to sequentially highlight the UI elements presented on the user's display screen 112 and/or to provide feedback indicating whether or not the user has successfully completed each step in the sequence of steps for the task.

In some implementations, the database 127 may also store context data that includes a plurality of contexts or subjects that can be associated with user queries and/or sub-queries. Each context can include one or more of content, topics, subject matters, key words, or attributes, among other examples. In some aspects, the context can include one or more previous portions of the interaction between the user and the automated assistant. In other instances, the context can include a browsing history of the user within a user assistance web page, or other websites associated with the online resource 120. In some other instances, the context can include a type of application through which the user sends the request to the online resource 120.

The knowledge base 128 may be used by the automated assistant 130 to provide real-time assistance to users of the online resource 120. The knowledge base 128, which can be created, updated, and otherwise modified in an offline environment by the offline engines 129, may be a vector database that stores indexed vectors so that proximity metrics and vector space computations may be used to efficiently query, search, retrieve, and/or manipulate the stored vectors (e.g., using similarity search, such as cosine similarity, Euclidean distance, dot product, or Mahalanobis distance). In various implementations, the knowledge base 128 may store information such as tokenization metadata (e.g., token-level representations with token strings, positions, and/or byte-pair encoding (BPE) IDs or other tokenizer IDs), latent representations (i.e., hidden states or contextual embeddings extracted from one or more layers of the LM 125), generated output and ranking metadata (e.g., log-probabilities, beam scores, sampling temperatures, decoding parameters, or the like), task-specific annotations or features (e.g., target words, term or sentence context, syntactic roles, semantic roles, dependency tree information, or the like), or any other suitable information that enables the online resource 120 to reuse and trace context across multiple NLP-related tasks, such as storing vector embeddings, answering user queries, identifying relevant points in vector space, retrieving relevant vector embeddings, and the like. In various aspects, the knowledge base 128 may store dense vectors (e.g., capturing nuanced relationships between prompts and outputs), vectorized embeddings, or other high-dimensional representations and associated feature vectors in a vector space, such as to enable efficient similarity searches, clustering, and advanced AI analytics.

The offline engines 129 may be used to construct, generate, and update the contents of the knowledge base 128 using transcripts of interactions between agents of the online resource 120 (such as self-help articles, human experts, and the automated assistant 130, among other examples) and a plurality of users of the online resource 120. The offline engines 129 may include at least a transformation engine, an embedding engine, an extraction engine, and a mapping engine (not shown in FIG. 1 for simplicity). In some instances, the transformation engine can transform each of a plurality of user interaction transcripts into a number of question-and-answer (Q&A) pairs. The Q&A pairs may be associated with one of a plurality of contexts or subjects corresponding to the user interactions. In other instances, the transformation engine can transform each of a plurality of user interaction transcripts into a node-based workflow, each node-based workflow including a sequence of nodes representing instructions extracted from the respective transcript and one or more node connectors representing actions to be performed by the user between the sequence of nodes. The transformation engine can also transform each node-based workflow into a graph of interconnected nodes based on the sequence of nodes and the one or more node connectors of the respective node-based workflow.

In some instances, the embedding engine can embed the Q&A pairs as vectorized pairs within a corresponding vector space of the knowledge base 128. In various aspects, each of the Q&A pairs may be mapped to a corresponding transcript used in generating the respective Q&A pair and may be mapped to a corresponding question used to generate the respective Q&A pair. Thereafter, the vectorized pairs embedded in the knowledge base can be retrieved by the automated assistant 130 and used to provide real-time expert assistance to a user of the online resource 120. In other instances, the embedding engine can embed the graphs of interconnected nodes in a vector space for retrieval by the automated assistant during subsequent user interactions. The extraction engine can extract details of a workflow embedded as a graph of interconnected nodes in a vector space of the database 127 and generate instructions for the user explaining how to perform various tasks and other operations associated with a particular product or service provided by the online resource 120. The mapping engine can map a sequence of steps associated with a particular task to be completed by the user with corresponding UI elements presented on the user's display screen. In some instances, the mapping engine can indicate the relationship between the interconnected nodes of the graph stored in the vector space and the instructions generated by the extraction engine, as well as the relationship between the generated instructions and the UI elements presented on the user's display screen.

The automated assistant 130 can be used to help the user obtain answers to questions pertaining to the operations, functionalities, capabilities, and/or other aspects of one or more products or services associated with the online resource 120, for example, by navigating the user through various menus, UI elements, websites, pages, links, and other information exchanges presented on the user's display screen 112 by the online resource 120. In some instances, the automated assistant 130 can provide the user with on-screen step-by-step instructions for completing various tasks associated with the products or services provided by the online resource 120. In some instances, the user can request the automated assistant 130 for assistance with a particular task by taking some action such as, for example, uttering a designated word or phrase (e.g., "open the automated assistant") or selecting an icon or button associated with the automated assistant to invoke the automated assistant 130. In other instances, the automated assistant 130 can be automatically invoked for certain tasks, when the online resource 120 determines that the user is unable to complete one or more steps of a particular task, or when the online resource 120 infers that the user is having difficulty completing the particular task, among other examples. For example, the automated assistant 130 can be automatically invoked by the online resource 120 when the user does not successfully complete a step within a period of time (e.g., when the user's cursor remains at the same UI element for more than the period of time), when the user provides incorrect or irrelevant input data at a given step (e.g., when the user enters an address, rather a name, at a UI element associated with a name input field), or when the user transitions to an incorrect next step (e.g., when the user's cursor navigates to a UI element that is not associated with the correct next step).

When the automated assistant 130 is invoked, the online resource 120 establishes an interaction between the user and the automated assistant 130. The user interaction may be an online chat, an exchange of direct messages, or a voice call, among other examples. During the user interaction, the automated assistant 130 identifies the user's reasons or topics for assistance, whether requested or inferred, and can present step-by-step instructions for completing a task, answers to user questions or user queries, web links, file links, graphics, articles, and other material on the user's display screen 112. The step-by-step instructions, which may correspond to a sequence of steps associated with the task, can be completed by the user using a corresponding sequence of UI elements presented on the user's display screen 112. In various aspects, the step-by-step instructions can be displayed within an assistant interface presented on the user's display screen 112. The assistant interface may also allow the user and the automated assistant 130 to chat, message, and/or talk with each other and to exchange other information with each other during the user interaction. In some aspects, the user can use the assistant interface to ask questions, provide queries, and upload information (among other examples) to the online resource 120.

In some instances, the automated assistant 130 can use a client (not shown in FIG. 1 for simplicity) executing on the user's computing device 110 to present graphics, animation, visual cues, and other effects on the user's display screen 112 during the user interaction. For example, when the automated assistant 130 presents step-by-step instructions for completing a task to the user, the automated assistant 130 may also highlight, animate, point to, or otherwise identify UI elements corresponding to the sequence of steps of the task. For another example, when a user has completed a current step of the task (e.g., by providing correct input data at the currently selected UI element on the user's display screen), the automated assistant 130 can determine the next UI element corresponding to the next step of the task (e.g., based on the step-to-UI element mapping), and then highlight, animate, or otherwise identify the next UI element presented on the user's display screen 112. For yet another example, when the user completes the current step of the task but then navigates to another UI element that does not correspond to the next step of the task (e.g., the user selects the wrong UI element), the automated assistant 130 can determine the next UI element corresponding to the next step of the task (e.g., based on the step-to-UI element mapping), and then highlight, animate, or otherwise identify the next UI element presented on the user's display screen.

The communications network 140 provides communication links between the online resource 120 and the computing device 110. The communications network 140 can be any suitable one or more communication networks including, for example, the Internet, a wide area network (WAN), a metropolitan area network (MAN), a wireless local area network (WLAN), a personal area network (PAN) such as Bluetooth®, a portion of the Public Switched Telephone Network (PSTN), a cellular telephone network, a radio access network (RAN) such as a Fifth Generation (5G) New Radio (NR) system, an Ethernet network, a cable network, a satellite network, or any combination thereof. In other implementations, the communications network 140 may provide communication links between the online resource 120 and each of the agents 140(1)-140(N).

Figure 2A:
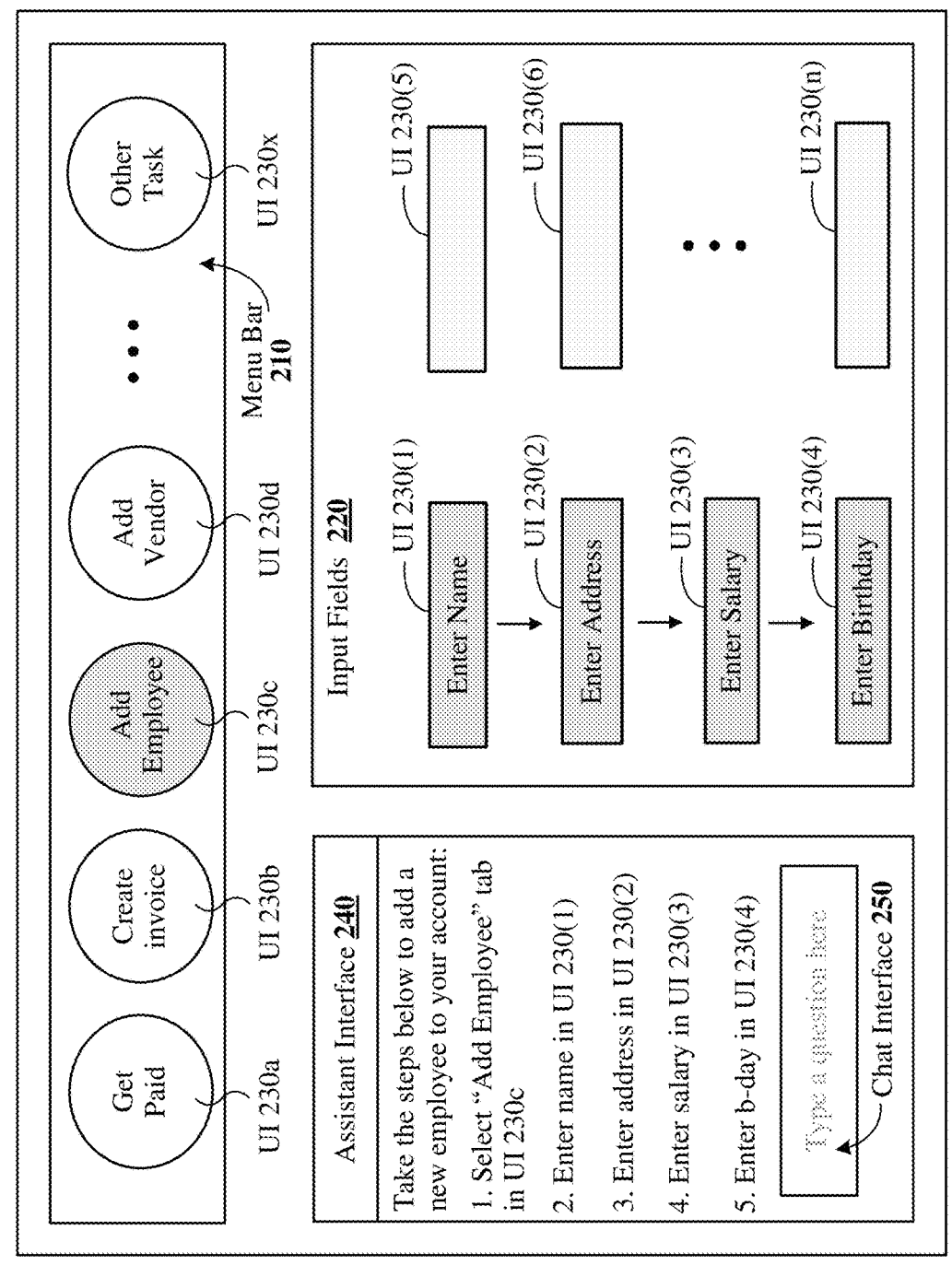
FIG. 2A shows an example of the user's display screen during a user interaction with an online resource, according to some implementations.

FIG. 2A shows an example of the user's display screen 200A during a user interaction with the online resource 120, according to some implementations. In the example of FIG. 2A, the display screen 200A illustrates a product or service provided by the online resource 120 that is accessed by a user over the communications network 140 via the computing device 110 of FIG. 1. The display screen 200A is shown to include a menu bar 210, input fields 220, a plurality of UI elements 230a-230x and 230(1)-230(n), and an assistant interface 240 including a chat interface 250. The menu bar 210 is shown to include UI elements 230a-230x arranged as icons selectable by the user to perform various tasks including, for example, UI element 230a to perform the task "Get Paid," UI element 230b to perform the task "Create Invoice," UI element 230c to perform the task "Add Employee," and UI element 230d to perform the task "Add Vendor." In other implementations, the menu bar 210 may include any suitable number of the UI elements 230a-230x arranged as icons, menus, links, or other selection means associated with a variety of tasks that can be performed by the user in conjunction with the product or service.

The input fields 220 are shown to include UI elements 230(1)-230(n) which can be selected by the user to perform various steps or operations associated with the task selected by the user via the menu bar 210. In the example of FIG. 2A, UI elements 230(1)-230(4) are associated with the task "Add Employee" associated with UI 230c in the menu bar 210. For example, the user can select (e.g., by clicking on) UI 230c to perform the task of adding an employee, and then sequentially select respective UI elements 230(1)-230(4) to provide the employee's name, address, salary, and birthday (among other examples) to the automated assistant 130. The other UI elements 230(5)-230(n) may be associated with other tasks. In this example, a mapping between the sequence of steps for adding an employee and their corresponding UI elements 230c and 230(1)-230(4) can be obtained from the database 127 and/or the knowledge base 128 and used, in conjunction with transcripts of previous user interactions involving the same or similar subjects, to generate step-by-step instructions for the user to add an employee.

The assistant interface 240 can be presented on the user's display screen 200A during user interactions with the automated assistant 130 to provide the step-by-step instructions to the user in real time. In the example of FIG. 2A, the assistant interface 240 is shown to provide the step-by-step instructions for adding an employee, for example, starting with selecting the task "Add Employee" associated with UI element 230c, and then progressing through the sequence of steps corresponding to UI elements 230(1)-230(4). In other instances, the assistant interface 240 can incrementally present the step-by-step instructions on the display screen 200A as the user successfully completes each step of the task. In some aspects, the assistant interface 240 can highlight the sequence of UI elements 230c and 230(1)-230(4) corresponding to the task "Add Employee" to help the user identify the UI elements associated with the task, as shown in FIG. 2A (the other UI elements 230a-230b, 230x, and 230(5)-230(n), which are not associated with this task, are not highlighted on the user's display screen 200A).

The assistant interface 240 can also present updated instructions, feedback, resources, answers to queries, visual cues, animation, and other material to the user while the user navigates through the UI elements 230 associated with completing a selected task. The feedback can indicate whether the user has navigated to and selected the correct UI element 230 to complete a current step of the task (e.g., whether the user initially selects the UI element 230c to perform the task "Add Employee"), whether the user has provided the correct type of input data in the UI element 230 corresponding to a current step of the task (e.g., whether the user has provided a name, rather than an address, into UI element 230(1)), whether after completion of the current step the user has navigated to and selected the correct UI element 230 corresponding to the next step of the task (e.g., whether the user, upon completing the current step by entering the employee name into UI element 230(1), navigates to and selects the UI element 230(2) corresponding to the next step of entering the employee's address), and whether the user has completed the sequence of steps of the task, among other examples. In some aspects, the assistant interface 240 can present a notification to the user upon completion of each step of the task and/or upon completion of the task. In other aspects, the assistant interface 240 can present animation, a sound, or a message to the user upon completion of each step of the task and/or upon completion of the task of the task.

Figure 2B:
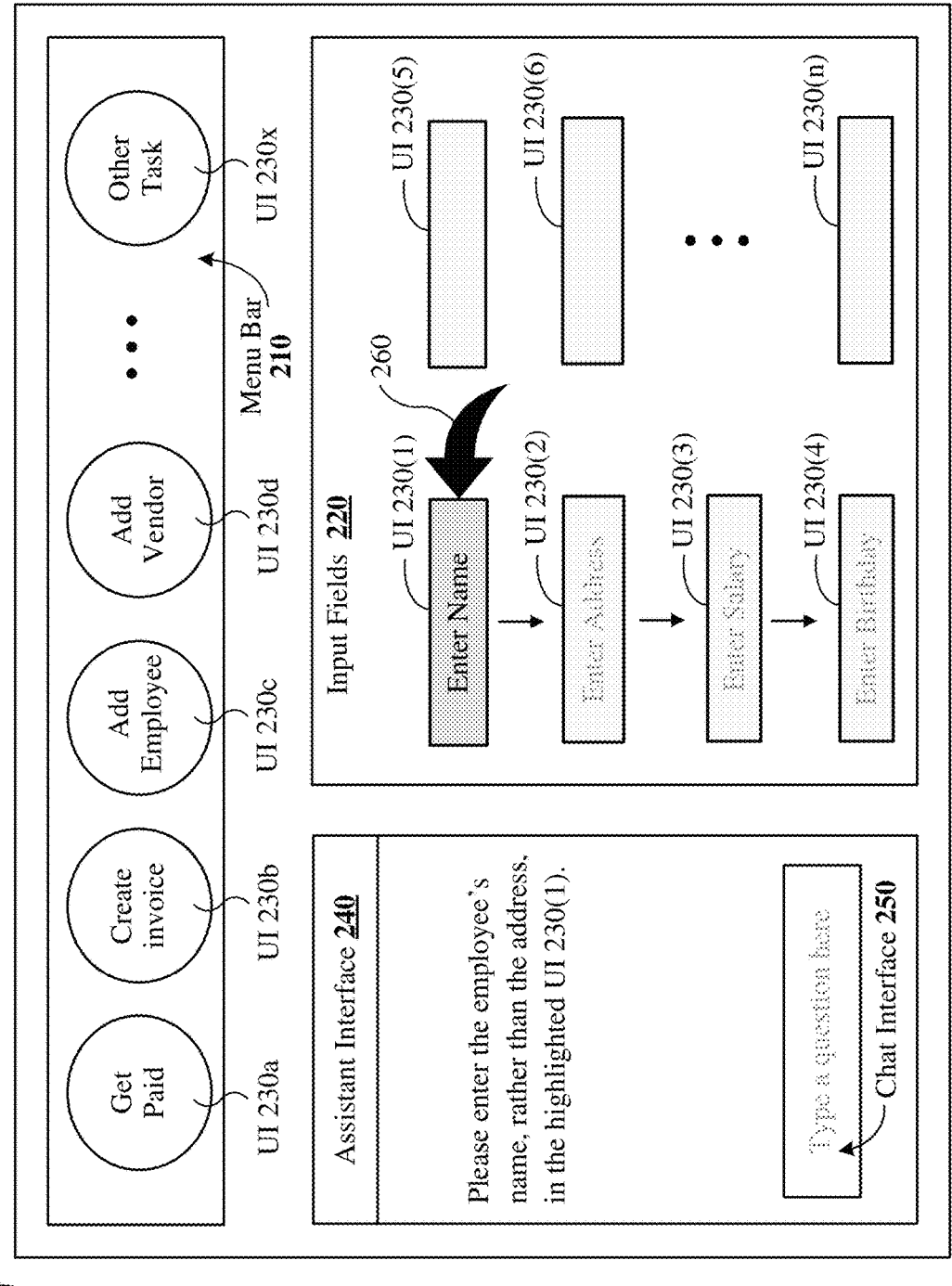
FIG. 2B shows another example of the user's display screen during a user interaction with an online resource, according to some implementations.

In some instances, the updated instructions can be generated based on the user's actions at a respective UI element 230 not resulting in completion of the corresponding step of the task. For example, if the user accidently enters the employee's address into the UI element 230(1) corresponding to the step of adding the employee's name (therefore not completing the current step), the assistant interface 240 can provide updated instructions such as "Please enter the employee's name, rather than the address, in the highlighted UI 230(1)," as depicted in FIG. 2B. In addition, or in the alternative, the assistant interface 240 can present an animation 260, shown as a curved arrow in FIG. 2B, to identify the corresponding UI element 230(1) for the user. In some aspects, the position and orientation of the animation 260 may be based on the user's cursor position on the display screen 200B relative to UI 230(1).

Figure 2C:
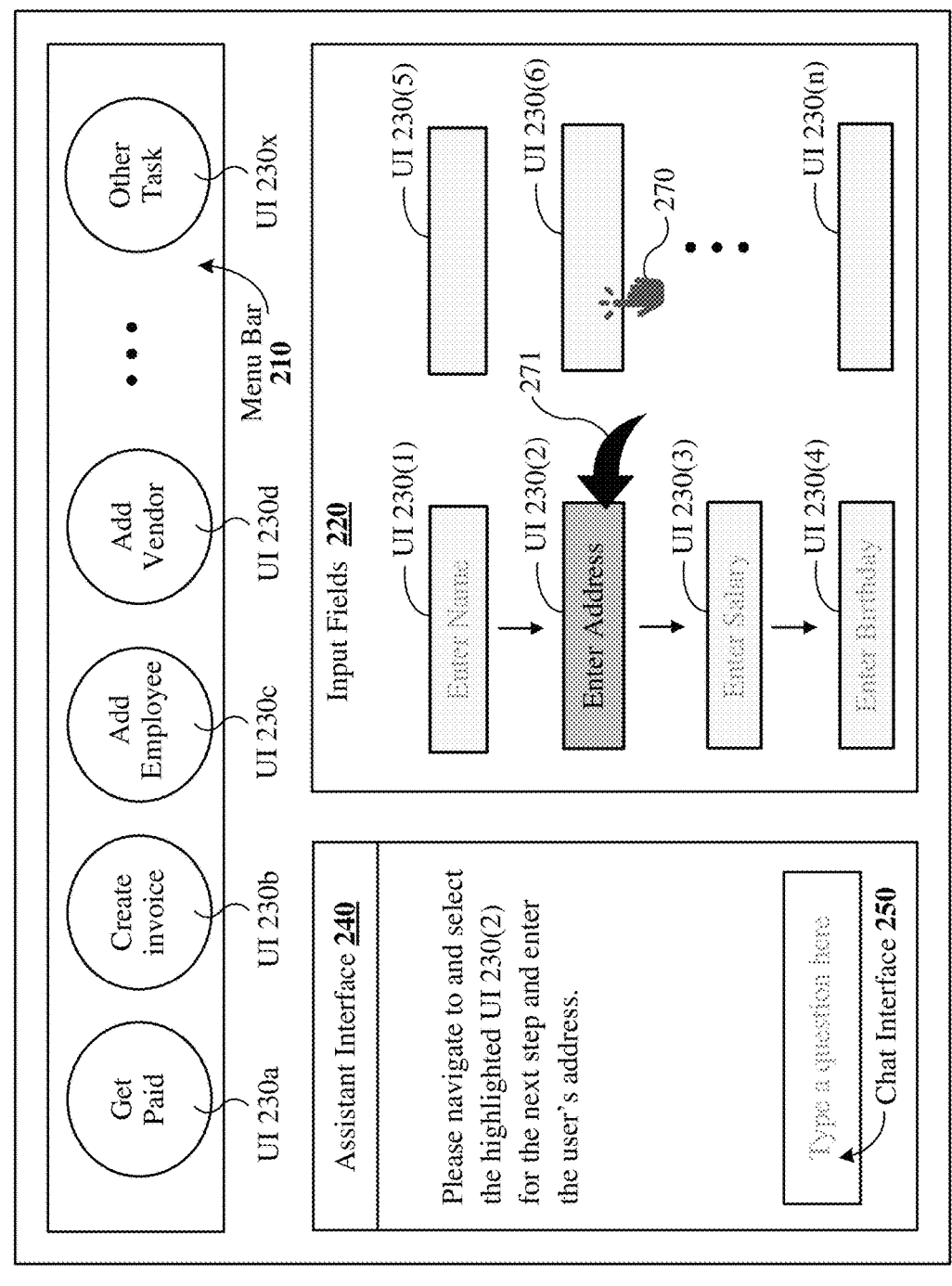
FIG. 2C shows another example of the user's display screen during a user interaction with an online resource, according to some implementations.

In other instances, the updated instructions can be generated based on the user completing a current step of the task and then navigating to or selecting a UI element 230 that is not associated with the next step (e.g., selecting the wrong UI element as the next UI element). For example, after the user completes the current step of adding the employee name into UI element 230(1), the user may incorrectly navigate to and select UI element 230(6), rather than UI element 230(2), to perform the next step, as indicated by the user's cursor position 270 in the example display screen 200C of FIG. 2C. In response thereto, the assistant interface 240 can provide updated instructions such as "Please navigate to and select the highlighted UI 230(2) for the next step and enter the user's address," as depicted in FIG. 2C. In some aspects, the assistant interface 240 can also present an animation 271, shown as a curved arrow in FIG. 2C, to identify UI element 230(2) as the correct next step for the user. In some aspects, the orientation of the animation 271 may be based on the user's cursor position on the display screen 200B relative to UI 230(2).

In some other instances, the automated assistant 130 may determine that the user is unable to complete the current step of a task, for example, because the user has not completed the current step within a duration of time, because the user has provided incorrect input data for certain a number of attempts, or because the user has transitioned to an incorrect UI element in certain a number of attempts, among other examples. In response thereto, the automated assistant 130 can select an expert based on a type of user input data associated with the corresponding step, and then initiate a conversation between the user and the selected expert over the communications network 140. The conversation can based at least in part on the corresponding user interaction with the automated assistant 130. In various aspects, the assistant interface 240 can present a notification to the user indicating that an associated conversation with an expert trained in the same or similar subjects has been initiated. If the conversation with the expert results in the user completing the current step of the task (e.g., indicating that the expert was able to successfully assist the user), the online resource 120 can generate a transcript of the conversation between the user and the selected expert and then update the knowledge base 128 by combining the transcript with corresponding portions of transcripts of previous user interactions associated with the current step. In this way, the online resource 120 can learn from both user interactions with the automated assistant 130 and from successful conversations with experts, and thereby continually increase the speed, efficiency, and accuracy with which the automated assistant 130 can successfully assist users to complete tasks associated with products or services provided by the online resource 120.

The chat interface 250 can facilitate a chat, a message exchange, and/or a voice call between the user and the automated assistant 130 during the user interaction. In some aspects, the chat interface 250 can be used by the assistant interface 240 to provide resources such as web links, file links, articles, and the like to the user. The chat interface 250 may also be used by the user to provide questions, queries, data, and other information to the automated assistant 130 during the user interaction.

Figure 3:
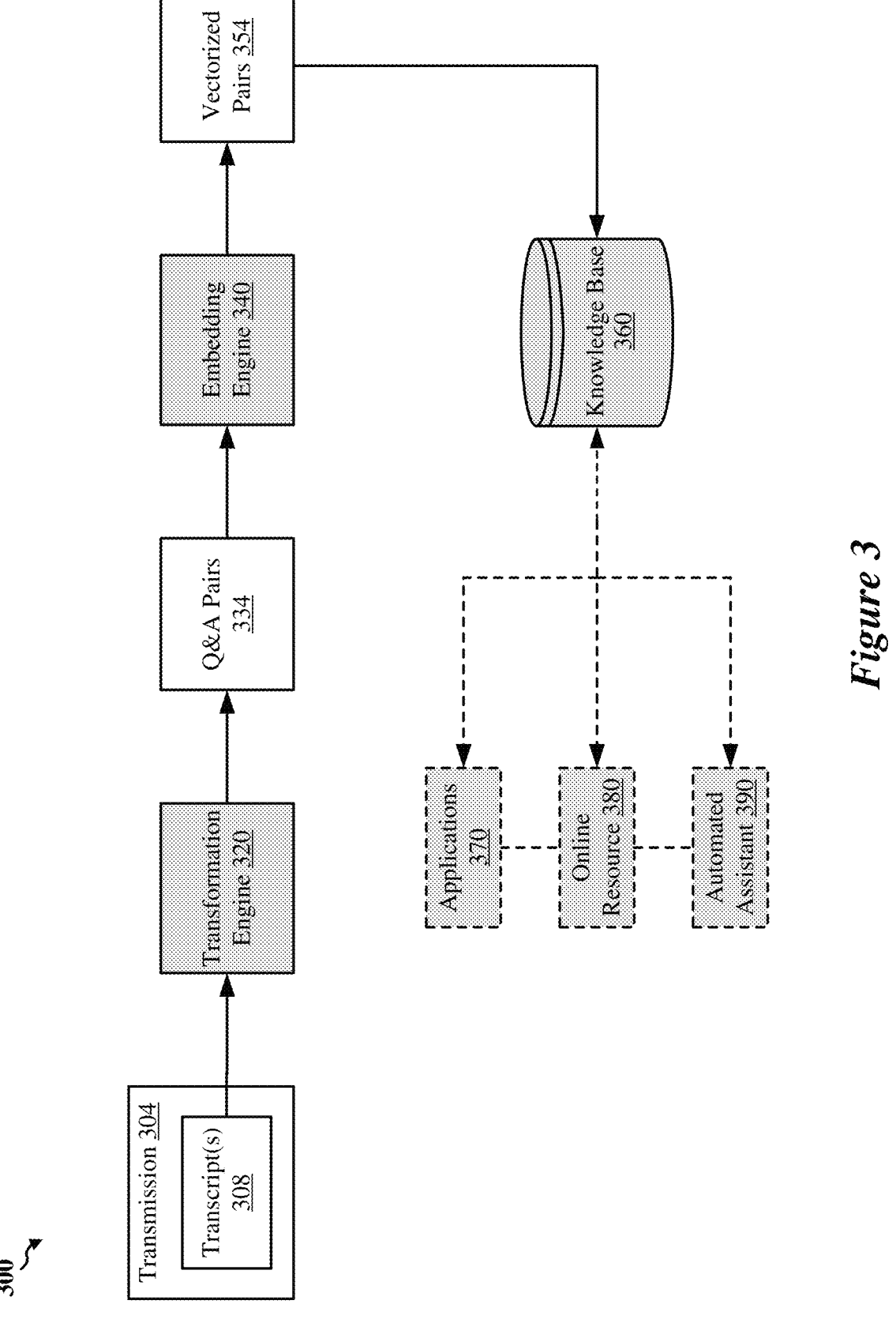
FIG. 3 shows an example process flow for generating a knowledge base, according to some implementations.

FIG. 3 shows an example process flow 300 for generating a knowledge base in an offline environment, according to some implementations. The example process flow 300 shows the application a transformation engine 320, an embedding engine 340, a knowledge base 360, an application 370, an online resource 380, and an automated assistant 390. In some instances, the knowledge base 360 may be one implementation of the knowledge base 128 of FIG. 1, the application 370 may be an example application 126 of FIG. 1, and the automated assistant 390 may be one implementation of the automated assistant 130 of FIG. 1.

The example process flow 300 starts with receiving a transmission 304 that includes one or more transcripts 308. In various aspects, the transmission 304 may be received over a communications network from a computing device (not shown for simplicity). Each of the transcripts 308 may be associated with a specific interaction between a user and an assistance resource associated with the online resource 120, where the assistance resource may be a self-help resource, a human expert, or the automated assistant 130. In various aspects, each of the transcripts 308 may include an agent portion representing the output provided by the assistance resource during the corresponding user interaction and may include a user portion representing the output provided by the user during the corresponding user interaction. Each of the user interactions may be associated with a subject such as, for example, technical issues, product information, billing inquiries, order tracking, user account management, or the like. The subjects can be related to any topic depending on the use case, and may be determined based on feeding the transcripts 308 to one or more LMs (such as the LMs 125 of FIG. 1) and prompting the LMs to output the subject for each transcript. In some instances, the LM may be prompted to select a most contextually relevant subject from a plurality of predefined subjects.

In some instances, each of the user interactions is mapped to an associated set of metadata that may include, for example, an identifier for the assistance resource, an identifier for a platform (e.g., a web portal, a mobile app, or the like) on which the given user interaction occurred, one or more tags (e.g., a product category, an issue type, or the like) indicating a subject of the given user interaction, a transfer flag (e.g., a binary flag, an escalation status, a transfer reason, or the like) indicating whether the given user interaction was escalated, a score (e.g., a user satisfaction rating, an agent performance rating, or the like) provided by the user for the given user interaction, or a resolution flag (e.g., a binary flag, an issue resolved status, a follow-up required indication, or the like) indicating whether the given user interaction was successfully resolved.

The transcripts 308 are provided to the transformation engine 320, which transforms each of one or more selected transcripts 308 into a plurality of question-and-answer (Q&A) pairs 334. Each of the Q&A pairs 334 may be associated with a subject determined for the user interaction corresponding to the selected transcript. In some instances, the transformation engine 320 determines whether each respective transcript 308 is worthy of transformation (e.g., of high enough quality) based on its associated metadata. As some non-limiting examples, a transcript 308 may be deemed not worthy of transformation if the associated metadata indicates that the agent associated with the given user interaction has less than a threshold level of experience (e.g., 6 months, 1 year, 3 years, or the like), if the platform on which the corresponding user interaction occurred is on an excluded list of platforms, if the subject of the corresponding user interaction is on an excluded list of subjects, if the corresponding user interaction was escalated (e.g., to a human or supervisor) based on the transfer flag, if the score provided by the user is below a score threshold, and/or if the corresponding user interaction was not successfully resolved based on the resolution flag. Transcripts 308 deemed worthy of transformation are transformed into corresponding Q&A pairs, while transcripts 308 deemed not worthy of transformation are discarded.

The transformation engine 320 generates a question for each transcript 308 based on the user portion associated with the respective transcript, and then generates an answer for the respective transcript based on the agent portion associated with the respective transcript. The questions and answers may be generated based on feeding the user portions and the agent portions to the LM, along with a prompt to generate the questions and answers based on the respective portions. The transformation engine 320 concatenates each generated question with its associated generated answer into a corresponding one of the Q&A pairs 334, thereby transforming each of the transcripts 308 into one or more Q&A pairs 334.

The Q&A pairs 334 are provided to the embedding engine 340, which embeds the Q&A pairs as vectorized pairs 354 within a corresponding vector space of the knowledge base 360. In various aspects, each of the Q&A pairs 334 may be mapped to (or otherwise associated with) a corresponding transcript used in generating the respective Q&A pair and may be mapped to (or otherwise associated with) a corresponding question used in generating the respective Q&A pair 334. The embedding engine 340 generates one or more quality scores for each of the Q&A pairs 334, for example, where each quality score may be representative of the suitability of the corresponding Q&A pair 334 for the vector space associated with the knowledge base 360.

The one or more quality scores for each of the Q&A pairs 334 are generated based on feeding the corresponding transcript, the question associated with the respective Q&A pair 334, and the answer associated with the respective Q&A pair 334 to the LM. In some instances, the LM may be prompted to generate one or more of an accuracy subscore, a relevance subscore, or a consistency subscore for each respective Q&A pair 334. In some aspects, the LM generates at least two of the subscores and determines the quality score for the respective Q&A pair 334 based on a combination (e.g., an average) of the at least two subscores. As some non-limiting examples, the system prompt may include at least one of an instruction that accuracy subscores are to indicate an extent to which the answer correctly answers the question based on the transcript (e.g., the answer correctly addresses the question based on information present within the transcript), an instruction that relevance subscores are to indicate an extent to which the answer is relevant to the question based on the transcript (e.g., the answer provides contextually appropriate information that pertains directly to the question asked, considering details from the provided transcript), or an instruction that consistency subscores are to indicate an extent to which a content of the question and answer matches a content of the transcript (e.g., the content of both the question and the answer aligns logically and coherently with information presented within the transcript).

In other instances, the LM may be prompted to generate one or more of a completeness assessment, a coherence subscore, or a generality subscore for each respective Q&A pair 334. In some aspects, the LM generates at least two of the subscores and determines the quality score for the respective Q&A pair 334 based on a combination (e.g., an average) of the at least two subscores. A system prompt may be provided to the LM providing instructions that guide the LM in generating the subscores. As some non-limiting examples, the system prompt may include at least one of an instruction that completeness assessments are to include a one word output indicating whether the answer comprehensively responds to the question (e.g., the answer provides all necessary information to address the user's query, leaving no gaps or ambiguities), an instruction that coherence subscores are to indicate an extent to which the answer is coherent (e.g., the answer presents information in a logical and organized manner, using clear and concise language that flows smoothly and is easy to understand), or an instruction that generality subscores are to indicate an extent to which the answer can be generally applied for any user (e.g., the answer provides guidance or solutions that are widely applicable, regardless of specific circumstances or contexts, and do not rely on specialized knowledge or assumptions about the user's situation).

The embedding engine 340 selectively embeds each respective Q&A pair 334 based on whether or not the quality scores associated with the respective Q&A pair 334 are above a threshold, for example, to determine whether each respective Q&A pair 334 is suitable for the vector space. In some instances, a combination (e.g., the average) of the subscores generated for the respective Q&A pair 334 are compared with a single overall threshold, while in other instances, each subscore generated is compared with a corresponding threshold. The embedding engine 340 may discard a respective Q&A pair 334 if the aggregate quality score is below the threshold or if one of the individual subscores is below its corresponding threshold. The embedding engine 340 generates a vector embedding for each remaining Q&A pairs 334, and embeds the vectors into the vector space of the knowledge base 360. Thereafter, the vectorized pairs 354 embedded in the knowledge base 360 can be retrieved by the automated assistant 130 and used to provide real-time expert assistance to a user of the online resource 120, for example, without relying on human experts associated with the online resource 120.

Figure 4:
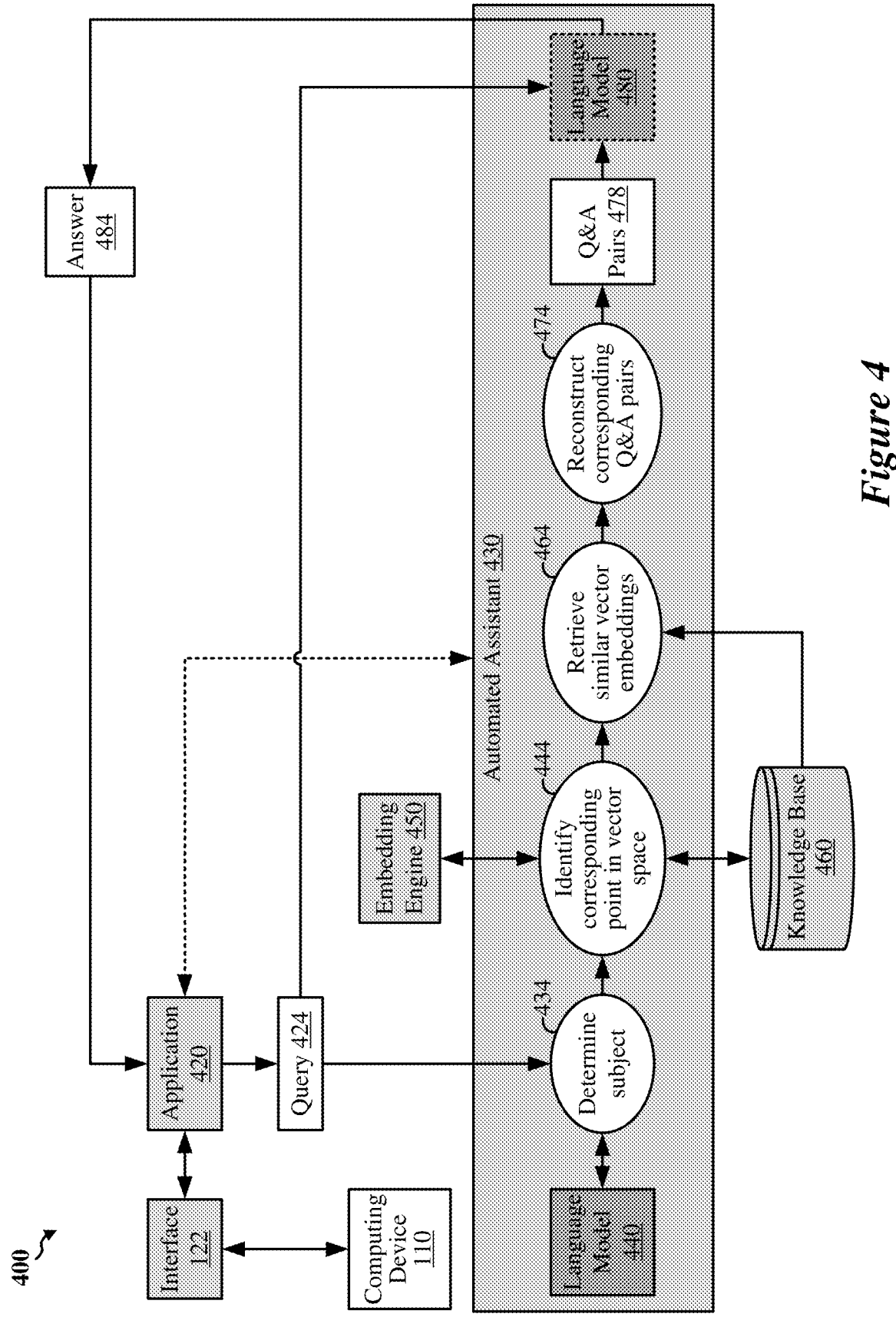
FIG. 4 shows an example process flow for using a knowledge base to generate an answer to a user's query, according to some implementations.

FIG. 4 shows an example process flow 400 for using a knowledge base to generate an answer to a user's query, according to some implementations. The process flow 400 may be performed by one or more processors of the online resource 120 of FIG. 1. The example process flow 400 shows the computing device 110 and the interface 122 of FIG. 1, as well as an application 420, an automated assistant 430, a first LM 440, a knowledge base 460, and a second LM 450. In various aspects, the application 420 may be an example of the application 126 of FIG. 1, the automated assistant 430 may be an example of the automated assistant 130 of FIG. 1, the LMs 440 and 480 may be examples of the LMs 125 of FIG. 1, and the knowledge base 460 may be an example of the knowledge base 128 of FIG. 1 or the knowledge base 360 of FIG. 3.

The example process flow 400 starts with receiving a query 424 at the automated assistant 430 during a user interaction with the online resource 120. The query 424 may be submitted by a user, over a communications network via the computing device 110, to the automated assistant 430 via the interface 122. In some aspects, the interface 122 may be used in conjunction with the application 420 to allow the user to interact with the automated assistant 430. In some instances, user queries are related to performing various tasks associated with the application 420.

At block 434, the automated assistant 430 determines a subject of the query 424. For example, in some aspects, the automated assistant 430 provides the query 424 to the LM 440 along with instructions for the LM 440 to provide the subject of the query 424 to the automated assistant 430. In some instances, the automated assistant 430 can prompt the LM 440 to classify the query 424 into one of a plurality of predefined subjects.

At block 444, the automated assistant 430 identifies a point in the vector space corresponding to the determined subject. It will be appreciated that each vector embedding in the vector space captures a semantic meaning of the original input, where relatively similar meanings are closer to each other in the vector space than relatively dissimilar meanings. In various aspects, the automated assistant 430 utilizes the embedding engine 450 to vectorize the determined subject into a subject vector embedding, thereby allowing the automated assistant 430 to query the knowledge base 460 to identify the point corresponding to the subject vector embedding.

At block 464, the automated assistant 430 retrieves one or more vector embeddings from the knowledge base 460 based on the identified point. Specifically, the automated assistant 430 retrieves one or more vector embeddings that correspond to Q&A pairs that are most similar to the determined subject. Similarity in the vector space may be determined quantitatively based on at least one of a similarity measure or a vector-based distance between vector embeddings. For instance, retrieving the one or more vector embeddings may include identifying a top N vector embeddings nearest to the identified point.

At block 474, the automated assistant 430 reconstructs the corresponding Q&A pairs from the one or more vector embeddings retrieved from the knowledge base 460, and provides the query 424 and the reconstructed Q&A pairs 478 to the LM 480. In addition, or in the alternative, the query 424 and the reconstructed Q&A pairs 478 may be provided to the LM 440. The LM 480 is configured to generate an answer 484 to the query 424 based on the reconstructed Q&A pairs 478. As a non-limiting example, the query 424 may be "I want to know how much I have in my account.", the identified subject may thus be "account balance," which may cause one of the reconstructed Q&A pairs to include a question of "How do I check my account balance?" and an answer of "You can determine your balance by clicking on 'Balance' at the top of the screen or within the 'Balance' tab in the mobile app.", and thus the generated answer 484 may be "You can check how much you have in your account by clicking on 'Balance' at the top of the screen or within the 'Balance' tab in the mobile app."

The answer 484 generated by the LM 480 may be presented to the user's display screen 112 of computing device 110 in at least near real-time with receiving the query 424 from the user. In some aspects, the answer 484 may be presented on the user's display screen within the assistant interface associated with the automated assistant 430. In other aspects, the answer 484 may be presented on other portions of the user's display screen, or provided to the user in audio.

Figure 5:
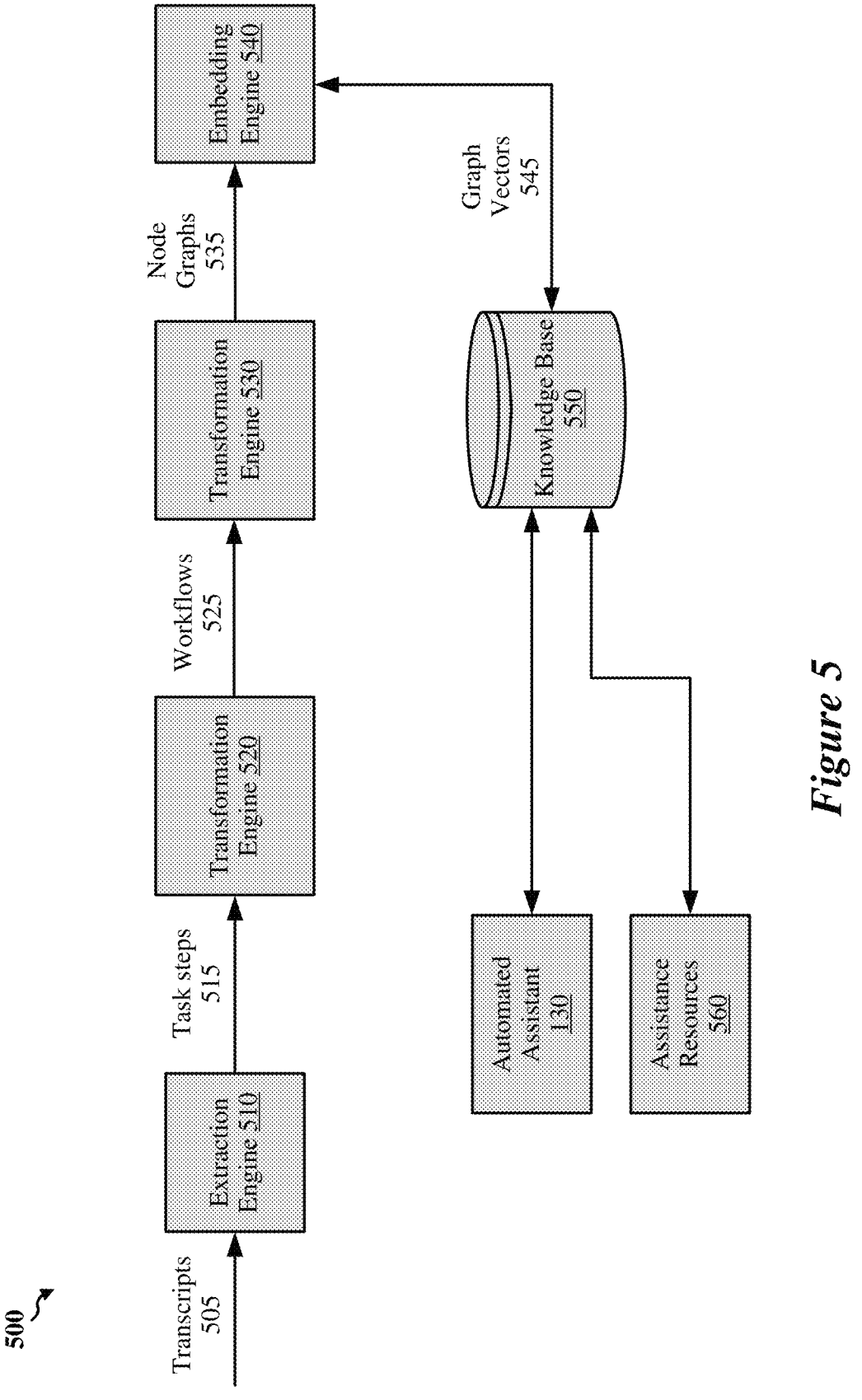
FIG. 5 shows an example process flow for generating a knowledge base, according to some other implementations.

FIG. 5 shows an example process flow 500 for generating a knowledge base, according to other implementations. The example process flow 500 shows an extraction engine 510, a first transformation engine 520, a second transformation engine 530, an embedding engine 540, a knowledge base 550, assistance resources 560, and the automated assistant 130 of FIG. 1. In some instances, the embedding engine 540 may be one implementation of the embedding engine 340 of FIG. 3, and the knowledge base 550 may be one implementation of the knowledge base 128 of FIG. 1 or the knowledge base 460 of FIG. 4.

The example process flow 500 starts with receiving transcripts 505 associated with user interactions with the online resource 120. Each of the transcripts 505 may be associated with a specific interaction between a user and a self-help resource, a human expert, or the automated assistant 130, and may be associated with a set of metadata that can be used to identify actions to be performed by the user to complete a given task. In some instances, the metadata includes a clickstream indicating which of a plurality of user interface (UI) elements presented on the user's display screen is clicked by the user in response to instructions provided by the expert or automated assistant 130 during a corresponding user interaction.

In various aspects, the user interactions may be associated with a subject such as, for example, technical issues, product information, billing inquiries, order tracking, user account management, or the like. The subjects can be related to any topic depending on the use case, and may be obtained by providing the transcripts 505 to one or more LMs (such as the LMs 125 of FIG. 1) along with a prompt instructing the LMs to determine the subject for each transcript 505. In some instances, the LM 125 may be prompted to select a most contextually relevant subject from a plurality of predefined subjects. In addition, or in the alternative, subjects associated with the user interactions may be identified using one or more user queries extracted from the corresponding transcripts 505.

The user interactions can be voice calls, online chats, direct message exchanges, or other suitable form of communication. As discussed above with respect to FIG. 3, each of the user interactions can be mapped to an associated set of metadata that may include, for example, an identifier for the assistance resource, an identifier for a platform on which the given user interaction occurred, one or more tags indicating a subject of the given user interaction, an escalation flag indicating whether the given user interaction was escalated (e.g., from the automated assistant 130 to a human expert), a score provided by the user for the given user interaction, or a resolution flag indicating whether issues raised by the user during the given user interaction were successfully resolved.

The transcripts 505 are provided to the extraction engine 510, which extracts audio and/or visual information from the transcripts 505 to extract the user queries or issues presented during each user interaction, to determine the tasks for which users requested assistance during each user interaction, to extract step-by-step instructions provided to users during each user interaction, and to determine an outcome of each user interaction. In some instances, audio information associated with each transcript 505 can be analyzed and compared with training data using an associated LM (such as the LM 125 of FIG. 1) to determine the queries, issues, tasks, step-by-step instructions, and other suitable information associated with a corresponding user interaction. Visual information associated with each transcript 505 can be used to determine the user's curser position, selected UI elements, click history, page views, and the like during a corresponding user interaction. In some instances, the extraction engine 510 may use Q&A information extracted from the transcripts 505 and/or help articles, expert articles, expert publications, and other reference material associated with the assistance resources 560 to determine the queries, issues, tasks, and step-by-step instructions associated with each user interaction.

In various instances, the task associated with a respective user interaction can be a function or operation related to a product or service provided by the online resource 120, and the issue can be that the user needs assistance from the online resource 120 to complete the task. The task may include a sequence of steps to be performed by the user using the UI elements presented on the user's display screen. In some aspects, each step in the sequence of steps of a task to be completed by the user can be mapped to a corresponding UI element presented on the user's display screen, and information identifying the next steps in the sequence of steps can be mapped to user actions associated with the corresponding UI elements. The step-by-step instructions 515 may include verbal instructions, visual cues, and UI elements highlighted by the expert or automated assistant 130, and may also include cursor positions, mouse clicks, pages, and/or UI elements selected by the user.

The step-by-step instructions 515 extracted from the transcripts 505 of each user interaction (and in some instances also the transcript 505) are provided to the first extraction engine 520. In some instances, each sequence of step-by-step instructions 515 may be validated using information stored in the assistance resources 560 prior to being provided to the transformation engine 520. Then, for each user interaction, the first extraction engine 520 transforms the corresponding transcript 505 and/or the corresponding step-by-step instructions into a workflow 525 that includes a sequence of nodes representing the extracted step-by-step instructions 515 and one or more node connectors each representing actions to be performed by the user at a corresponding node in the sequence of nodes. In some implementations, the transformation engine 520 may provide a respective transcript and a prompt to an associated LM (such as the LMs 125 of FIG. 1) and use the LM to extract the step-by-step instructions provided by the expert or automated assistant 130 during the user interaction. In some aspects, the extracted step-by-step instructions may be chronologically sorted and then used to generate the corresponding workflow 525.

The workflows 525 corresponding to a plurality of different user interactions are provided to the second transformation engine 530, which transforms each workflow 525 into a corresponding graph 535 of interconnected nodes based on the sequence of nodes and the one or more node connectors of the respective workflow 525. In some instances, the transformation engine 530 identifies the subject associated with each transcript 505 and then clusters the workflows 525 into a plurality of workflow clusters based on the identified subjects, for example, so that each workflow cluster corresponds to one of the identified subjects. The transformation engine 530 generates each of the node graphs 535 based on the workflows 525 within the same workflow cluster. In various aspects, the transformation engine 530 generates each node graph 535 by identifying similar instructions in the respective workflow cluster based on the sequences of nodes in the respective workflow cluster, and then grouping the similar instructions into a same node within the corresponding graph of interconnected nodes.

The node graphs 535 are provided to the embedding engine 540, which embeds the node graphs 535 as vector graphs 545 in a vector space of the knowledge base 550. In some instances, the embedding engine 540 incorporates one or more aspects of a feature extraction technique, a graph embedding technique, a graph neural network (GNN), or a graph kernel technique when embedding the node graphs 535 in the vector space of the knowledge base 550. In other instances, the embedding engine 540 can vectorize each of the node graphs 435 into a corresponding vector embedding, and then index the vector embeddings in the vector space of the knowledge base 550 based on the subject determined for the corresponding user interaction. In some aspects, each vector embedding may be indexed by obtaining a set of sample queries and keywords associated with a common subject of the workflows 525, and then associating each node graph 535 with the corresponding set of obtained queries and keywords.

Thereafter, the embedded node graphs 535 may be retrieved by the automated assistant 130 and used to construct workflows including step-by-step instructions for subsequent user interactions with the online resource 130. For example, referring also to FIG. 1, the online resource 120 may establish, over communications network 140, a subsequent user interaction that indicates an issue to be resolved with assistance from the automated assistant 130. The extraction engine 510 may determine a subject of the issue to be resolved, identify a workflow cluster within the knowledge base 550 that is most similar to the subject of the subsequent user interaction, and then resolve the issue using the node graph 545 corresponding to the identified workflow cluster. In this manner, the online resource 120 can leverage previously used workflows for similar issues, along with their corresponding evaluation results, to increase the speed and accuracy with which the automated assistant 130 provides step-by-step instructions to the user. In some aspects, identifying the workflow cluster that is most similar to the subject of the subsequent user interaction may include identifying a point in the vector space corresponding to the determined subject, and then determining which of the embedded graphs of interconnected nodes is closest to the identified point based on at least one of a similarity measure or a vector-based distance.

Figure 6:
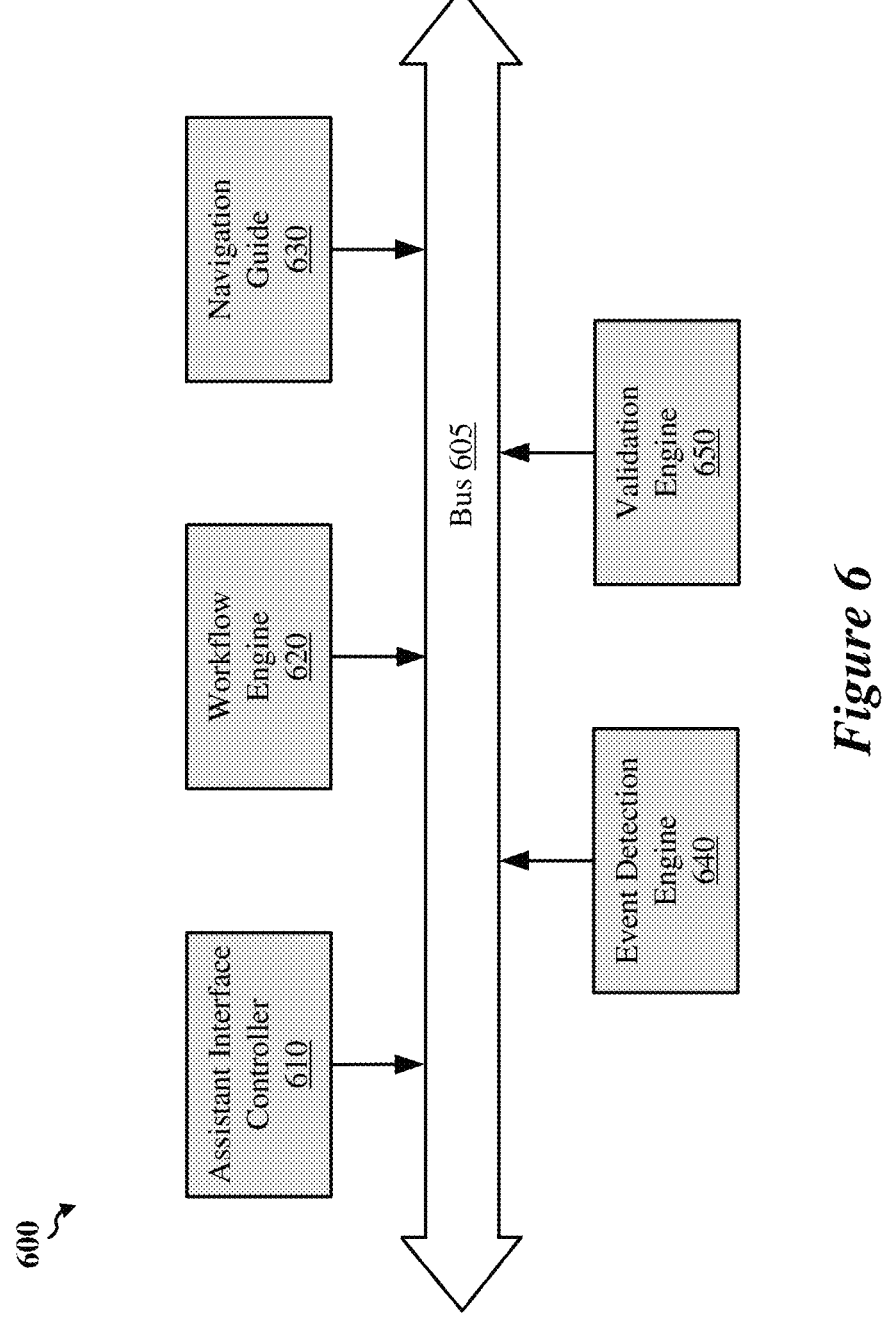
FIG. 6 shows a block diagram of an automated assistant, in accordance with some implementations.

FIG. 6 shows a block diagram of an automated assistant 600, in accordance with some implementations. The automated assistant 600, which may be one implementation of the automated assistant 130 of FIG. 1, the automated assistant 390 of FIG. 3, or the automated assistant 430 of FIG. 4, is shown to include an assistant interface controller 610, a workflow engine 620, a navigation guide 630, an event detection engine 640, and a validation engine 650 coupled to one another by a bus 605. The automated assistant 600 can provide users of the online resource 120 with dynamic, real-time assistance with performing various tasks associated with a product or service provided by the online resource 120. The tasks may be related to accessing or managing user accounts associated with the product or service, performing various functions or operations within the product or service, resolving issues or questions pertaining to the product or service, and the like.

As described above, the task may include a sequence of steps for the user to complete via user interface (UI) elements presented on the user's display screen 112. The UI elements are associated with the product or service and allow the user to provide information to the product or service, to make selections of data, functions, operations, and the like associated with the product or service, and so on. The UI elements may include selectable buttons or icons, navigation links, data input fields, menus of predefined operations, and/or other suitable interactive fields through which the user can provide information or make selections within the product or service to complete the task.

The assistant interface controller 610 can present an assistant interface (such as the assistant interface 240 of FIG. 2A) on the user's display screen 112 during user interactions with the automated assistant 600, for example, to provide real-time assistance to a user performing a task or operation associated with the product or service. More specifically, the assistant interface controller 610 can provide instructions, feedback, resources, answers to queries, graphics, and other material to the user via the assistant interface 240200. The instructions can include step-by-step instructions for completing a task or operation, and the feedback can indicate whether the user has selected the UI element corresponding to a current step of the task, whether the user has entered a type of data in the currently-selected UI element that is consistent with the type of data associated with the current step, whether the user has successfully completed the current step, and whether the user has successfully completed the task, among other examples. The resources can include web links, file links, articles, and the like. The graphics can include visual cues, animation, screenshots, video guides, and the like. The assistant interface controller 610 can provide the instructions and/or feedback to the user as audio, video, or text. The assistant interface controller 610 can also receive information provided by the user via the assistant interface 240. In some aspects, the assistant interface controller 610 can also facilitate chat, messaging, and/or voice calls between the user and the automated assistant 600.

The workflow engine 620 can identify the task (or at least one or more relevant subjects) for which the user needs assistance and then retrieve a workflow from the knowledge base 128 based on the identified task. In some aspects, the workflow engine 620 may utilize at least a portion of the process flow 300 of FIG. 3 to select the workflow in the knowledge base 128 for retrieval. The retrieved workflow identifies the sequence of steps through which the user is to traverse to complete the task. The workflow engine 620 may obtain a mapping between the sequence of steps of the retrieved workflow and the UI elements associated with the product or service, and use the mapping to generate step-by-step instructions that guide the user through a series of UI elements presented on the user's display screen to successfully complete the task.

The navigation guide 630 can assist the user with navigating to and selecting the UI element corresponding to each step of the task's workflow. In various aspects, the navigation guide 630 can determine which of the sequence of steps the user is currently performing and then, after the user completes the step, the navigation guide 630 can point to, highlight, or otherwise identify the UI element corresponding to the next step in the sequence of steps. In some instances, the navigation guide 630 can determine the current step of task to be completed based on the user's cursor position on the display screen and/or the UI element currently selected by the user, highlight or otherwise identify a UI element corresponding to the next step in the sequence, and then determine whether the user successfully navigated to and/or selected the UI element corresponding to the next step based on the user's next cursor position on the display screen.

The event detection engine 640 monitors user actions including, for example, determining the user's cursor position on the display screen, tracking the user's cursor movement on the display screen, identifying the UI element (if any) currently selected by the user, classifying data or menu selections provided by the user via the currently-selected UI element, tracking the user's click history and page views, and observing other user activity during the user interaction. These monitored user actions can be used to dynamically update the instructions, feedback, visual cues, and other guidance provided to the user via the assistant interface 240. These monitored user actions may also be used to validate the user's completion of each step in the task workflow, and therefore also determine whether the user can transition from a current step of the task workflow to a next step of the task workflow. Moreover, in some aspects, the event detection engine 640 can determine the dimensions of the user's display screen and dynamically adjust the size and the layout of UI elements presented on the user's display screen based on the determined dimensions, for example, to ensure that the UI elements are presented within the determined dimensions of the user's display screen.

In some implementations, the event detection engine 640 can monitor the period of time during which the user remains at the same UI element and trigger an invocation of the automated assistant 600 if the period of time exceeds a predetermined duration of time (which may indicate that the user is unable to complete the step). For example, if the user's cursor position has remained on the current UI element for more than a threshold time period without entering data or selecting menu items, the event detection engine 640 may determine that the user needs assistance and invoke the automated assistant 600 to provide the user with step-by-step instructions for completing the task. For another example, if the user's cursor position is determined to be at a location that is inconsistent with the screen placement of the current UI element (corresponding to the current step of the task), the automated assistant 600 can highlight the current UI element, navigate the user to the current UI element, and identify the type of data to be provided by the user via the current UI element. For yet another example, if the user's cursor movement and/or click history indicates that the user is navigating to a UI element that does not correspond to the next step of the task, the automated assistant 600 can navigate the user to the UI element corresponding to the next step. For yet another example, if the user's cursor movement and/or click history indicates that the user accidently clicked the wrong link or navigated to the wrong UI element, the automated assistant 600 can reset the user to the beginning of the sequence of steps or can return the user to the UI element corresponding to a previously completed step.

The validation engine 650 determines whether or not the user has completed each respective step of the task workflow based on one or more of the user's cursor position and/or movement, the user's click history (also referred to herein as the user's clickstream), and input data provided by the user into the UI element corresponding to the respective step. In some instances, the validation engine 650 can use the workflow and the step-to-UI element mapping for the task (e.g., retrieved from the knowledge base 128) to obtain the type or subject of input data expected from the user at the currently-selected UI element, and use the LMs 125 of the online resource 120 to determine the type of input data actually received from the user at the currently-selected UI element. The validation engine 650 can obtain a degree of similarity between the expected data type and the received data type, and then use the obtained degree of similarity to determine whether the user provided the correct type of input data at the currently-selected UI element.

For example, if the currently-selected UI element is for entering an employee name and the user instead provides an address (which would result in a relatively low degree of similarity), the validation engine 650 may determine that the user did not complete the corresponding step. In response thereto, the assistant interface controller 610 may update the instructions provided to the user, for example, to request the user to enter the employee name (rather than the address). Conversely, if the user provided the employee name in the currently-selected UI element, the validation engine 650 may verify that a name was entered by the user and therefore the corresponding step of the task workflow is complete. In response thereto, the navigation guide 630 may navigate the user to the next UI element corresponding to the next step of the task workflow.

FIG. 7 shows an illustrative flowchart depicting an example operation 700 for assisting a user of an online resource, according to some implementations. The example operation 700 may be performed by the online resource 120 described with respect to FIG. 1. For example, at 702, the online resource 120 receives, from a user over a communications network coupled to the online resource, a request for assistance with a task to be completed by the user. The task includes a sequence of steps corresponding to a plurality of UI elements presented on a display screen associated with the user. At 704, the online resource 120 establishes, over the communications network, an interaction between the user and an automated assistant based on the request. At 706, the online resource 120 presents, on the display screen via the communications network, an assistant interface for the user interaction. At 708, the online resource 120 generates instructions for the user to perform each step of the sequence of steps of the task based at least in part on transcripts of one or more previous user interactions. At 710, the online resource 120 provides, to the user over the communications network, the instructions in the assistant interface presented on the display screen. At 712, the online resource 120 determines whether or not user actions associated with the plurality of UI elements presented on the display screen result in completion of the sequence of steps of the task. At 714, the online resource 120 indicates, to the user via the assistant interface presented on the display screen, completion of the task in response to determining that the user actions resulted in the completion of the sequence of steps.

The instructions may be based on a mapping between the sequence of steps and the plurality of UI elements presented on the display screen. The mapping may be based on a graph of nodes interconnected by branches. Each node may be associated with instructions for a corresponding step of the sequence of steps, and each branch originating at a respective node may be associated with a different user action associated with the UI element corresponding to the respective node.

Figure 8:
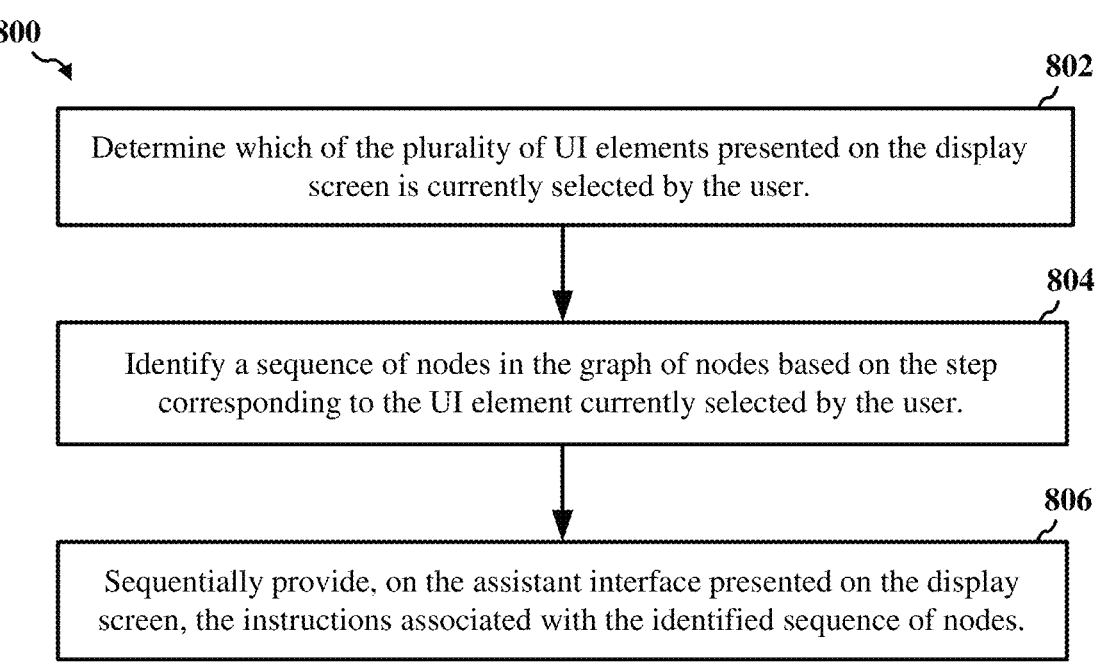
FIG. 8 shows an illustrative flowchart depicting another example operation for assisting a user of an online resource, according to some implementations.

FIG. 8 shows an illustrative flowchart depicting another example operation 800 for assisting a user of an online resource for assisting a user of an online resource, according to some implementations. The operation 800 may be performed by the online resource 120 of FIG. 1 as one example of generating the instructions 708 in FIG. 7. For example, at 802, the online resource 120 determines which of the plurality of UI elements presented on the display screen is currently selected by the user. At 804, the online resource 120 identifies a sequence of nodes in the graph of nodes based on the step corresponding to the UI element currently selected by the user. At 806, the online resource 120 sequentially provides, on the assistant interface presented on the display screen, the instructions associated with the identified sequence of nodes. The online resource 120 can determine the UI element currently selected by the user based on a position of the user's cursor on the display screen.

Figure 9:
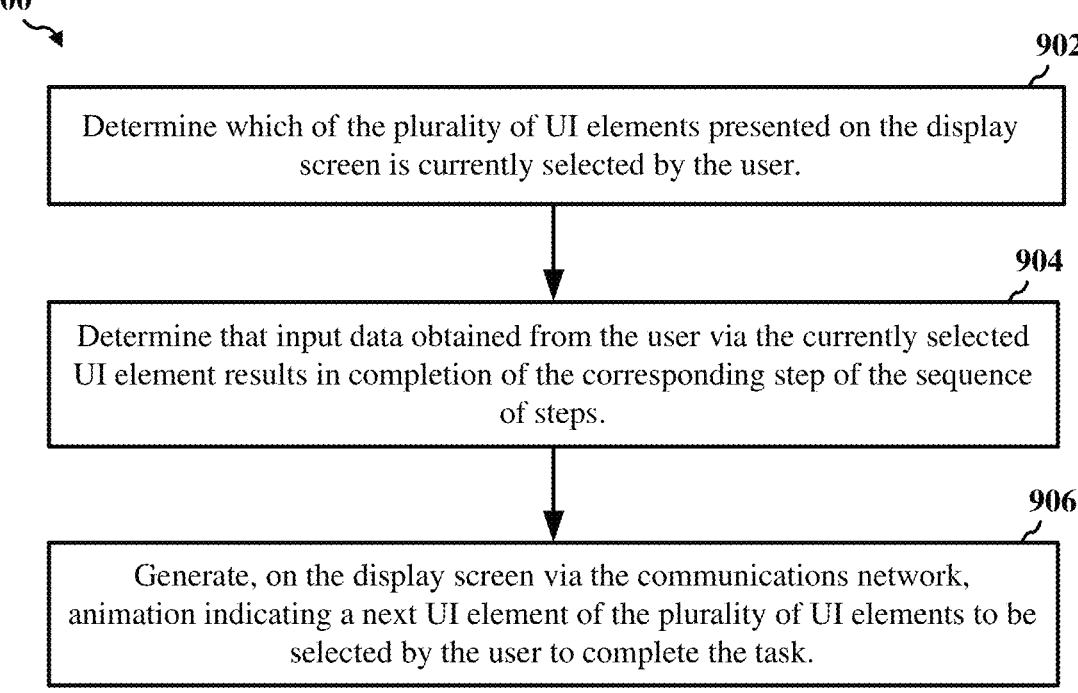
FIG. 9 shows an illustrative flowchart depicting another example operation for assisting a user of an online resource, according to some implementations.

FIG. 9 shows an illustrative flowchart depicting another example operation 900 for assisting a user of an online resource, according to some implementations. The operation 810 may be performed by the online resource 120 of FIG. 1 after the example operation 800 of FIG. 8A. For example, at 912, the online resource 120 determines which of the plurality of UI elements presented on the display screen is currently selected by the user. At 914, the online resource 120 determines that input data obtained from the user via the currently selected UI element results in completion of the corresponding step of the sequence of steps. At 916, the online resource 120 generates, on the display screen via the communications network, animation indicating a next UI element of the plurality of UI elements to be selected by the user to complete the task. The online resource 120 can determine the UI element currently selected by the user based on a position of the user's cursor on the display screen.

FIG. 10A shows an illustrative flowchart depicting another example operation 1000 for assisting a user of an online resource, according to some implementations. The operation 1000 may be performed by the online resource 120 of FIG. 1 after the example operation 700 of FIG. 7. For example, at 1002, the online resource 120 determines that a user action associated with a respective UI element does not result in completion of the step corresponding to the respective UI element. At 1004, the online resource 120 updates the instructions for the corresponding step based at least in part on the user action associated with the respective UI element. At 1006, the online resource 120 provides, to the user over the communications network, the updated instructions in the assistant interface presented on the display screen.

FIG. 10B shows an illustrative flowchart depicting another example operation 1010 for assisting a user of an online resource, according to some implementations. The operation 1010 may be performed by the online resource 120 of FIG. 1 after the example operation 1000 of FIG. 10A. For example, at 1012, the online resource 120 determines that the corresponding step cannot be completed by the user based on the updated instructions. At 1014, the online resource 120 selects an expert based on a type of user input data associated with the corresponding step. At 1016, the online resource 120 initiates a conversation between the user and the selected expert over the communications network, the conversation based at least in part on the user interaction between the user and the automated assistant.

Figure 10C:
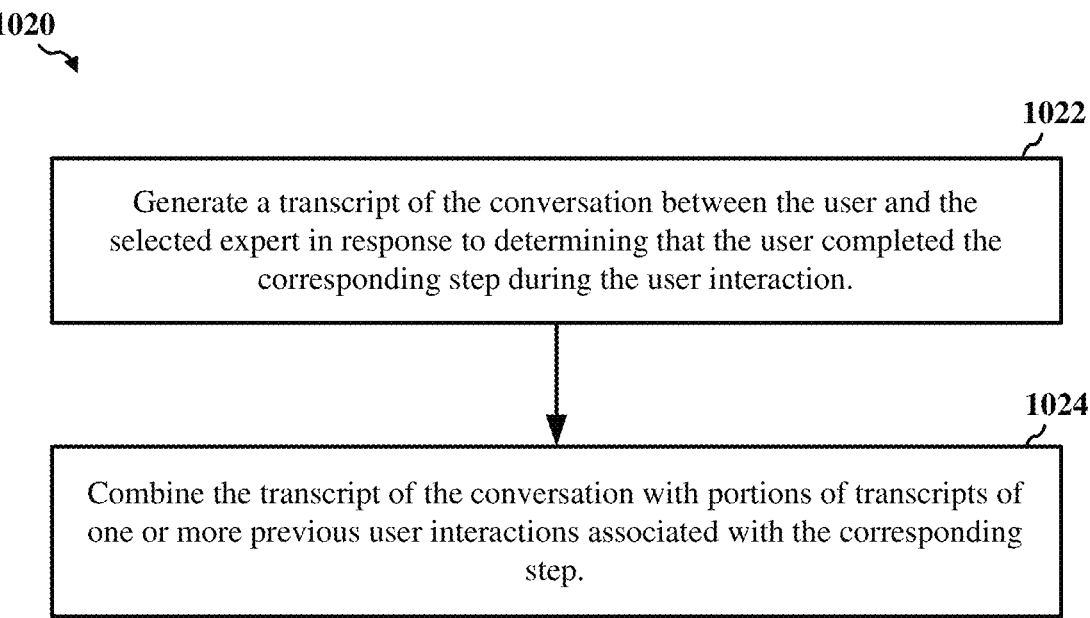
FIG. 10C shows an illustrative flowchart depicting another example operation for assisting a user of an online resource, according to some implementations.

FIG. 10C shows an illustrative flowchart depicting another example operation 1020 for assisting a user of an online resource, according to some implementations. The operation 1020 may be performed by the online resource 120 of FIG. 1 after the example operation 1010 of FIG. 10B. For example, at 1022, the online resource 120 generates a transcript of the conversation between the user and the selected expert in response to determining that the user completed the corresponding step during the user interaction. At 1024, the online resource 120 combines the transcript of the conversation with portions of transcripts of one or more previous user interactions associated with the corresponding step.

As used herein, a phrase referring to "at least one of" a list of items refers to any combination of those items, including single members. As an example, "at least one of: a, b, or c" is intended to cover: a, b, c, a-b, a-c, b-c, and a-b-c.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The various illustrative logics, logical blocks, modules, circuits, and algorithm processes described in connection with the implementations disclosed herein may be implemented as electronic hardware, computer software, or combinations of both. The interchangeability of hardware and software has been described, in terms of functionality, and illustrated in the various illustrative components, blocks, modules, circuits and processes described above. Whether such functionality is implemented in hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A method for assisting a user of an online resource, the method performed by one or more processors associated with the online resource and comprising:

receiving, from a user over a communications network coupled to the online resource, a request for an automated assistant associated with the online resource to provide step-by-step instructions for completing a task by the user, wherein the task includes a sequence of steps corresponding to a plurality of user interface (UI) elements presented on a display screen associated with the user;

establishing, over the communications network, a user interaction between the user and an automated assistant based on the request;

presenting, on the display screen via the communications network, an assistant interface associated with the user interaction;

generating instructions for the user to perform each step of the sequence of steps of the task based at least in part on transcripts of one or more previous user interactions with the automated assistant;

providing, to the user over the communications network, the instructions in the assistant interface presented on the display screen;

for each step of the task:

determining that the user has navigated to and selected the UI element corresponding to the step based at least in part on the user's cursor position on the display screen;

determining that input data obtained from the user via the selected UI element results in completion of the step; and generating, on the display screen via the communications network, animation indicating a next UI element corresponding to the next step of the task to be selected by the user, wherein an orientation of the animation is based on the user's cursor position relative to a location of the next UI element presented on the display screen;

determining whether or not user actions associated with the plurality of UI elements presented on the display screen result in completion of the sequence of steps of the task; and indicating, to the user via the assistant interface presented on the display screen, completion of the task in response to determining that the user actions resulted in the completion of the sequence of steps.

2. The method of claim 1, wherein the instructions are further based on a mapping between the sequence of steps and the plurality of UI elements presented on the display screen.

3. The method of claim 2, wherein the mapping is based on a graph of nodes interconnected by branches, each node associated with instructions for a corresponding step of the sequence of steps, and each branch originating at a respective node is associated with a different user action associated with the UI element corresponding to the respective node.

4. The method of claim 3, wherein generating the instructions includes:

determining which of the plurality of UI elements presented on the display screen is currently selected by the user;

identifying a sequence of nodes in the graph of nodes based on the step corresponding to the UI element currently selected by the user; and sequentially providing, on the assistant interface presented on the display screen, the instructions associated with the identified sequence of nodes.

5. The method of claim 1, further comprising:

determining that a user action associated with a respective UI element does not result in completion of the step corresponding to the respective UI element;

updating the instructions for the corresponding step based at least in part on the user action associated with the respective UI element; and providing, to the user over the communications network, the updated instructions in the assistant interface presented on the display screen.

6. The method of claim 5, further comprising:

determining that the corresponding step cannot be completed by the user based on the updated instructions;

selecting an expert based on a type of user input data associated with the corresponding step; and initiating a conversation between the user and the selected expert over the communications network, the conversation based at least in part on the user interaction between the user and the automated assistant.

7. The method of claim 6, further comprising:

generating a transcript of the conversation between the user and the selected expert in response to determining that the user completed the corresponding step during the conversation; and combining the transcript of the conversation with portions of transcripts of previous user interactions associated with the corresponding step.

8. A computing system associated with an online resource, the computing system comprising:

one or more processors; and a memory communicatively coupled with the one or more processors and storing program code that, when executed by the one or more processors, causes the computing system to:

receive, from a user over a communications network coupled to the online resource, a request for an automated assistant associated with the online resource to provide step-by-step instructions for completing a task by the user, wherein the task includes a sequence of steps corresponding to a plurality of user interface (UI) elements presented on a display screen associated with the user;

establish, over the communications network, a user interaction between the user and an automated assistant based on the request;

present, on the display screen via the communications network, an assistant interface associated with the automated assistant;

generate instructions for the user to perform each step of the sequence of steps of the task based at least in part on transcripts of one or more previous user interactions with the automated assistant;

provide, to the user over the communications network, the instructions in the assistant interface presented on the display screen;

for each step of the task:

determining that the user has navigated to and selected the UI element corresponding to the step based at least in part on the user's cursor position on the display screen;

determining that input data obtained from the user via the selected UI element results in completion of the step; and generating, on the display screen via the communications network, animation indicating a next UI element corresponding to the next step of the task to be selected by the user, wherein an orientation of the animation is based on the user's cursor position relative to a location of the next UI element presented on the display screen;

determine whether or not user actions associated with the plurality of UI elements presented on the display screen result in completion of the sequence of steps of the task; and indicate, to the user via the assistant interface presented on the display screen, completion of the task in response to determining that the user actions resulted in the completion of the sequence of steps.

9. The computing system of claim 8, wherein the instructions are further based on a mapping between the sequence of steps and the plurality of UI elements presented on the display screen.

10. The computing system of claim 9, wherein the mapping is based on a graph of nodes interconnected by branches, each node associated with instructions for a corresponding step of the sequence of steps, and each branch originating at a respective node is associated with a different user action associated with the UI element corresponding to the respective node.

11. The computing system of claim 10, wherein execution of the program code to generate the instructions causes the computing system to:

determine which of the plurality of UI elements presented on the display screen is currently selected by the user;

identify a sequence of nodes in the graph of nodes based on the step corresponding to the UI element currently selected by the user; and sequentially provide, on the assistant interface presented on the display screen, the instructions associated with the identified sequence of nodes.

12. The computing system of claim 8, wherein execution of the program code further causes the computing system to:

determine that a user action associated with a respective UI element does not result in completion of the step corresponding to the respective UI element;

update the instructions for the corresponding step based at least in part on the user action associated with the respective UI element; and provide, to the user over the communications network, the updated instructions in the assistant interface presented on the display screen.

13. The computing system of claim 12, wherein execution of the program code further causes the computing system to:

determine that the corresponding step cannot be completed by the user based on the updated instructions;

select an expert based on a type of user input data associated with the corresponding step; and initiate a conversation between the user and the selected expert over the communications network, the conversation based at least in part on the user interaction between the user and the automated assistant.

14. The computing system of claim 13, wherein execution of the program code further causes the computing system to:

generate a transcript of the conversation between the user and the selected expert in response to determining that the user completed the corresponding step during the conversation; and combine the transcript of the conversation with portions of transcripts of previous user interactions associated with the corresponding step.

\* \* \* \* \*